US012627798B2

(12) United States Patent
Yin et al.

(10) Patent No.: US 12,627,798 B2
(45) Date of Patent: May 12, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Wenbin Yin, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/620,780

(22) Filed: Mar. 28, 2024

(65) Prior Publication Data

US 2024/0244200 A1 Jul. 18, 2024

Related U.S. Application Data

(63) Continuation of application No. PCT/CN2022/121925, filed on Sep. 27, 2022.

(30) Foreign Application Priority Data

Sep. 28, 2021 (WO) ................ PCT/CN2021/121494

(51) Int. Cl.
*H04N 19/117* (2014.01)
*H04N 19/176* (2014.01)
*H04N 19/80* (2014.01)
(52) U.S. Cl.
CPC ......... *H04N 19/117* (2014.11); *H04N 19/176* (2014.11); *H04N 19/80* (2014.11)

(58) Field of Classification Search
CPC .. H04N 19/117; H04N 19/176; H04N 19/182; H04N 19/80; H04N 19/82; H04N 19/85
See application file for complete search history.

(56) References Cited

U.S. PATENT DOCUMENTS

| | | | |
|---|---|---|---|
| 11,711,512 B2 * | 7/2023 | Bordes ................... | H04N 19/70 375/240.02 |
| 2005/0265452 A1 * | 12/2005 | Miao ...................... | H04N 19/80 375/E7.262 |

(Continued)

FOREIGN PATENT DOCUMENTS

| | | |
|---|---|---|
| CN | 103081467 A | 5/2013 |
| CN | 106464879 A | 2/2017 |

(Continued)

OTHER PUBLICATIONS

International Search Report issued in corresponding International Application No. PCT/CN2022/121925 dated Nov. 30, 2022.

(Continued)

*Primary Examiner* — Md N Haque
(74) *Attorney, Agent, or Firm* — Astute IP Law Group

(57) ABSTRACT

Embodiments of the present disclosure provide a solution for video processing. A method for video processing comprises: determining, from a plurality of filter shapes during a conversion between a current video block of a video and a bitstream of the video, a first filter shape for coding a first sample of the current video block; and performing the conversion based on the first filter shape. Compared with the conventional solution, the proposed method can advantageously improve the performance of the filtering tool.

19 Claims, 29 Drawing Sheets

(56) References Cited

U.S. PATENT DOCUMENTS

| | | | |
|---|---|---|---|
| 2011/0274158 A1* | 11/2011 | Fu | H04N 19/134 |
| | | | 375/E7.127 |
| 2012/0051438 A1 | 3/2012 | Chong et al. | |
| 2012/0082244 A1 | 4/2012 | Chen et al. | |
| 2012/0183050 A1 | 7/2012 | Liu et al. | |
| 2014/0328414 A1* | 11/2014 | Puri | H04N 19/136 |
| | | | 375/240.29 |
| 2015/0365703 A1 | 12/2015 | Puri et al. | |
| 2017/0237981 A1* | 8/2017 | Karczewicz | H04N 19/117 |
| | | | 375/240.12 |
| 2017/0339432 A1* | 11/2017 | Chao | H04N 19/439 |
| 2018/0041778 A1 | 2/2018 | Zhang et al. | |
| 2020/0236355 A1* | 7/2020 | Zhao | H04N 19/157 |
| 2020/0374518 A1 | 11/2020 | Hu et al. | |
| 2021/0067774 A1 | 3/2021 | Yasugi et al. | |
| 2021/0076032 A1* | 3/2021 | Hu | H04N 19/159 |
| 2021/0084340 A1* | 3/2021 | Li | H04N 19/82 |
| 2021/0152841 A1 | 5/2021 | Hu et al. | |
| 2021/0306673 A1 | 9/2021 | Sarwer et al. | |
| 2021/0385446 A1 | 12/2021 | Liu et al. | |
| 2022/0078415 A1 | 3/2022 | Taquet et al. | |
| 2022/0159249 A1 | 5/2022 | Taquet et al. | |
| 2022/0182680 A1* | 6/2022 | Du | H04N 19/186 |

FOREIGN PATENT DOCUMENTS

| | | | |
|---|---|---|---|
| CN | 109479130 A | | 3/2019 |
| GB | 2591446 A | | 8/2021 |
| JP | 2021505074 A | * | 2/2021 |
| WO | 2020063552 A1 | | 4/2020 |
| WO | 2020211809 A1 | | 10/2020 |
| WO | 2021101345 A1 | | 5/2021 |
| WO | 2021155778 A1 | | 8/2021 |

OTHER PUBLICATIONS

International Search Report issued in corresponding International Application No. PCT/CN2022/121928 dated Nov. 29, 2022.

Faouzi Kossentini: CE8 Subtest 4: "Adaptive Loop Filtering Using Two Filter Shapes" Joint Collaborative Team on Video Coding (JCT-VC) of ITU-T SG-16 Wp3 and ISO/IEC JTCI/SC29/WG11 6th Meeting, Torino, Italy: Document JCTVC-F041, Jul. 22, 2011, the whole document.

Non-Final Office Action for U.S. Appl. No. 18/620,827, mailed on May 14, 2025, 10 pages.

* cited by examiner

400

X    Location of luma sample

O = Location of chroma sample

700

800

900

1000

1100

1200

1300

1400

1500

1600

2000

2100

2200

2300

2400

2500

2700

2900

3000

3002

DETERMINE, FROM A PLURALITY OF FILTER SHAPES DURING A CONVERSION BETWEEN A CURRENT VIDEO BLOCK OF A VIDEO AND A BITSTREAM OF THE VIDEO, A FIRST FILTER SHAPE FOR CODING A FIRST SAMPLE OF THE CURRENT VIDEO BLOCK

3004

PERFORM THE CONVERSION BASED ON THE FIRST FILTER SHAPE

1

METHOD, APPARATUS, AND MEDIUM FOR VIDEO PROCESSING

CROSS REFERENCE

This application is a continuation of International Application No. PCT/CN2022/121925, filed on Sep. 27, 2022, which claims the benefit of International Application No. PCT/CN2021/121494 filed on Sep. 28, 2021. The entire contents of these applications are hereby incorporated by reference in their entireties.

FIELD

Embodiments of the present disclosure relates generally to video coding techniques, and more particularly, to filter shape selection for adaptive loop filter in video coding.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, performance of conventional video coding techniques is generally expected to be further improved.

SUMMARY

Embodiments of the present disclosure provide a solution for video processing.

In a first aspect, a method for video processing is proposed. The method comprises: determining, from a plurality of filter shapes during a conversion between a current video block of a video and a bitstream of the video, a first filter shape for coding a first sample of the current video block; and performing the conversion based on the first filter shape.

According to the proposed method, a sample of a video block is coded with a filter shape selected from a plurality of filter shapes. Compared with the conventional solution where a fixed filter shape is used, the proposed method can advantageously improve the performance of the filtering tool, and thus the coding performance can be improved.

In a second aspect, an apparatus for processing video data is proposed. The apparatus for processing video data comprises a processor and a non-transitory memory with instructions thereon. The instructions upon execution by the processor cause the processor to perform a method in accordance with the first aspect of the present disclosure.

In a third aspect, a non-transitory computer-readable storage medium is proposed. The non-transitory computer-readable storage medium storing instructions that cause a processor to perform a method in accordance with the first aspect of the present disclosure.

In a fourth aspect, another non-transitory computer-readable recording medium is proposed. The non-transitory computer-readable recording medium stores a bitstream of a video which is generated by a method performed by a video processing apparatus. The method comprises: determining, from a plurality of filter shapes, a first filter shape for coding a first sample of a current video block of the video; and generating the bitstream based on the first filter shape.

In a fifth aspect, a method for storing a bitstream of a video is proposed. The method comprises: determining, from a plurality of filter shapes, a first filter shape for coding a first sample of a current video block of the video; generating the bitstream based on the first filter shape; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
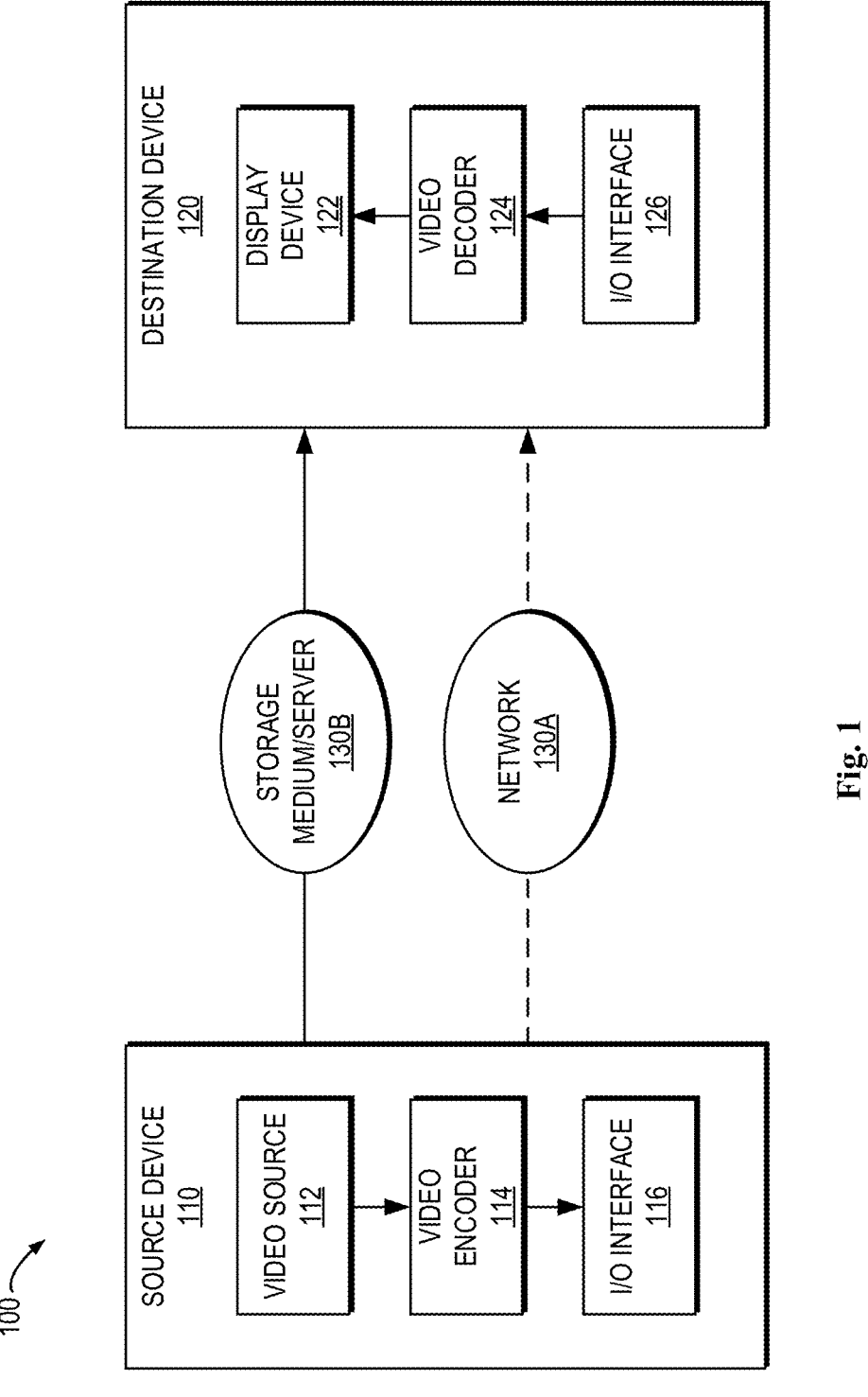
FIG. 1 illustrates a block diagram of an example video coding system in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
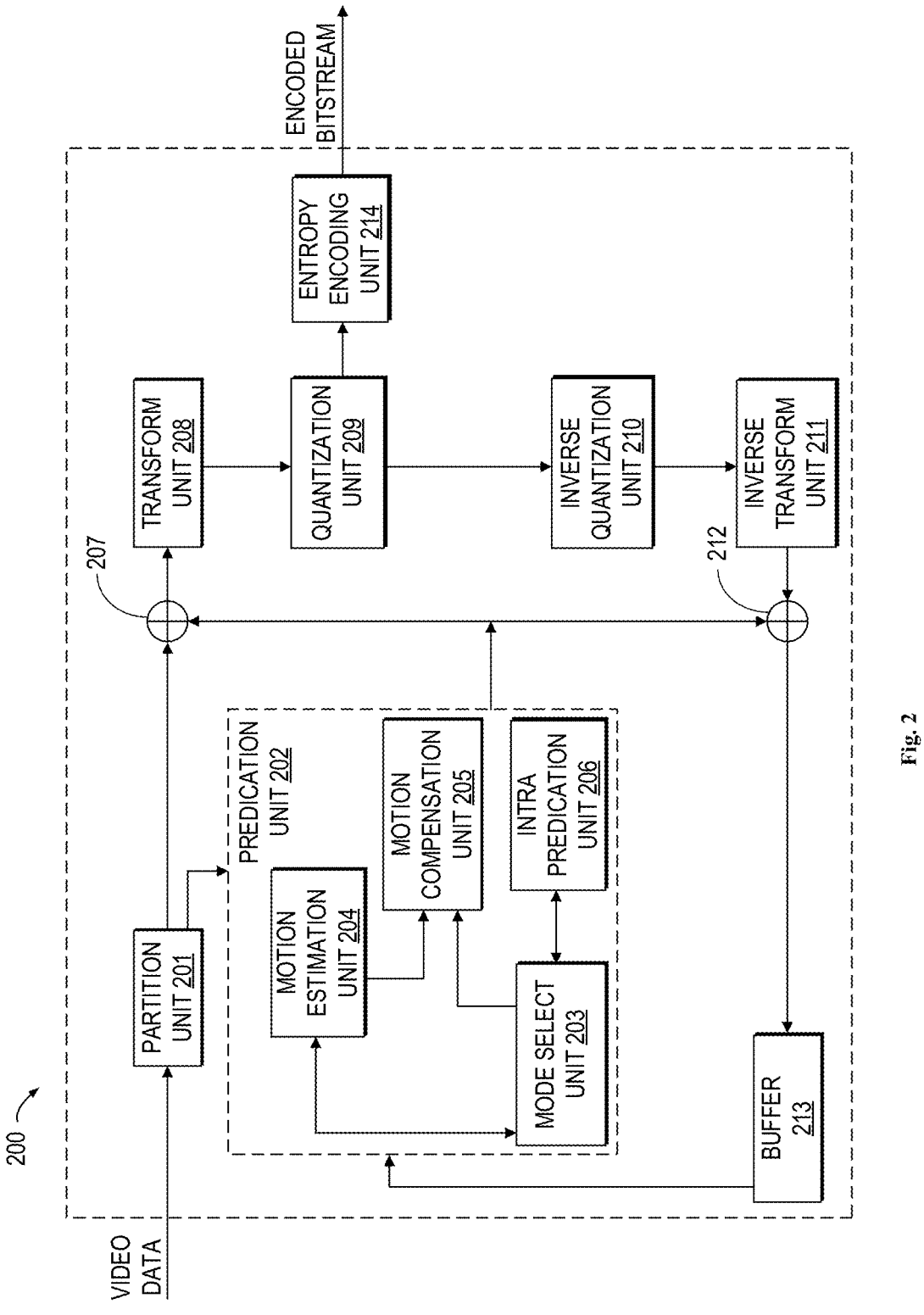
FIG. 2 illustrates a block diagram of an example video encoder in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the other video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
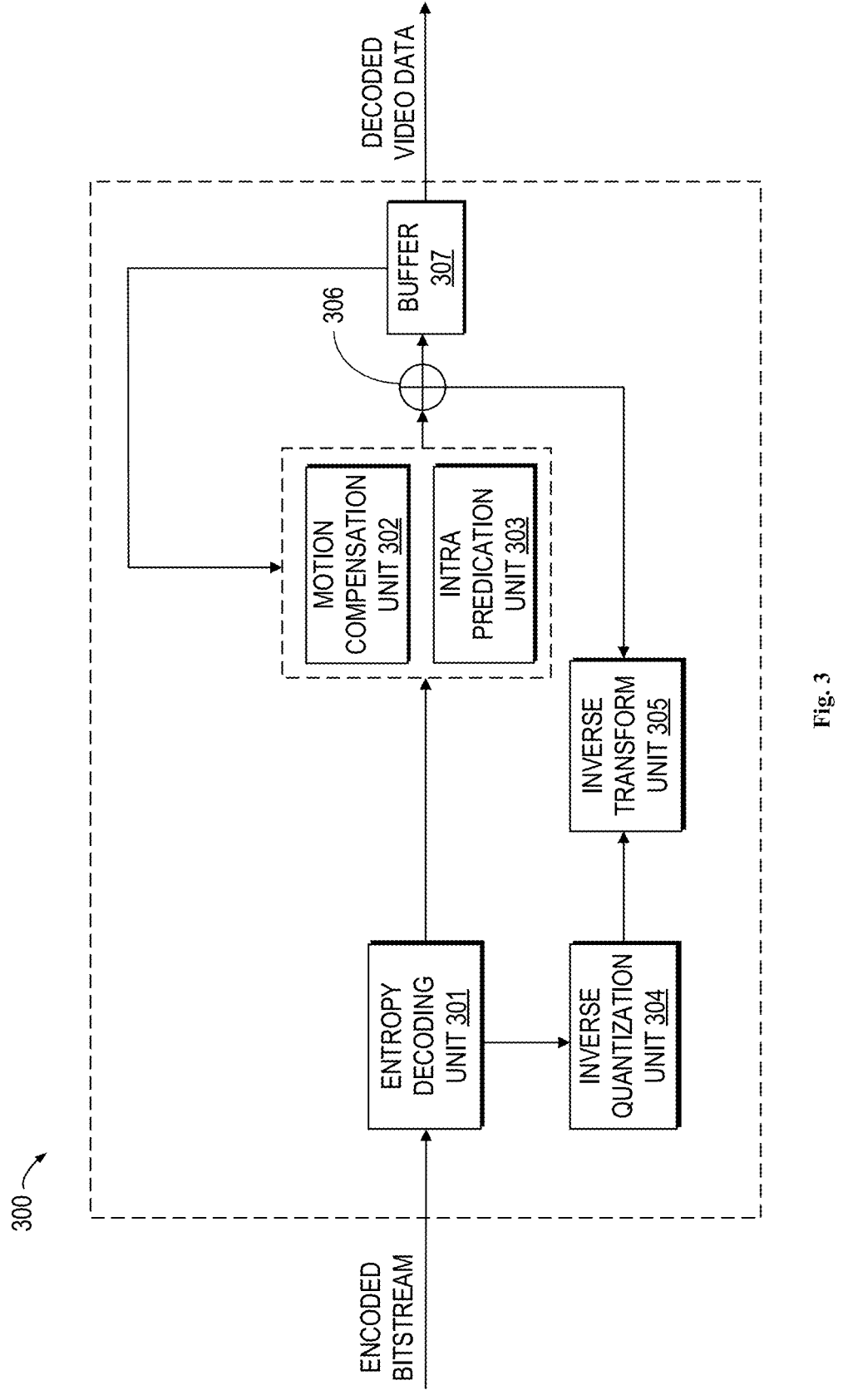
FIG. 3 illustrates a block diagram of an example video decoder in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is related to in-loop filter and other coding tools in image/video coding. The ideas may be applied individually or in various combination, to any existing video coding standard or non-standard video codec like High Efficiency Video Coding (HEVC) and Versatile Video Coding (VVC). The proposed ideas may be also applicable to future video coding standards or video codec.

2. Abbreviations

AVC Advanced Video Coding
CPB Coded Picture Buffer

CRA Clean Random Access
CTU Coding Tree Unit
CVS Coded Video Sequence
DPB Decoded Picture Buffer
DPS Decoding Parameter Set
GCI General Constraints Information
HEVC High Efficiency Video Coding
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RRP Reference Picture Resampling
RBSP Raw Byte Sequence Payload
SEI Supplemental Enhancement Information
SH Slice Header
SPS Sequence Parameter Set
VCL Video Coding Layer
VPS Video Parameter Set
VTM VVC Test Model
VUI Video Usability Information
VVC Versatile Video Coding
TU Transform Unit
CU Coding Unit
DF Deblocking Filter
SAO Sample Adaptive Offset
ALF Adaptive Loop Filter
CBF Coding Block Flag
QP Quantization Parameter
RDO Rate Distortion Optimization
BF Bilateral Filter

3. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/ HEVC (J. Strom, P. Wennersten, J. Enhorn, D. Liu, K. Andersson and R. Sjoberg, "Bilateral Loop Filter in Combination with SAO," in proceeding of IEEE Picture Coding Symposium (PCS), November 2019.) standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting.

ITU-T VCEG (Q6/16) and ISO/IEC MPEG (JTC 1/SC 29/WG 11) are studying the potential need for standardization of future video coding technology with a compression capability that significantly exceeds that of the current VVC standard. Such future standardization action could either take the form of additional extension(s) of VVC or an entirely new standard. The groups are working together on this exploration activity in a joint-collaboration effort known as the Joint Video Exploration Team (JVET) to evaluate compression technology designs proposed by their experts in this area. The first Exploration Experiments (EE) were established in JVET meeting during 6-15 Jan. 2021 and the reference software named as Enhanced Compression Model (ECM). The test model ECM is updated after every JVET meeting.

3.1. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries. Chroma subsampling is the practice of encoding images by implementing less resolution for chroma information than for luma information, taking advantage of the human visual system's lower acuity for color differences than for luminance.

3.1.1 4:4:4

Each of the three Y'CbCr components have the same sample rate, thus there is no chroma subsampling. This scheme is sometimes used in high-end film scanners and cinematic postproduction.

3.1.2 4:2:2

Figure 4:
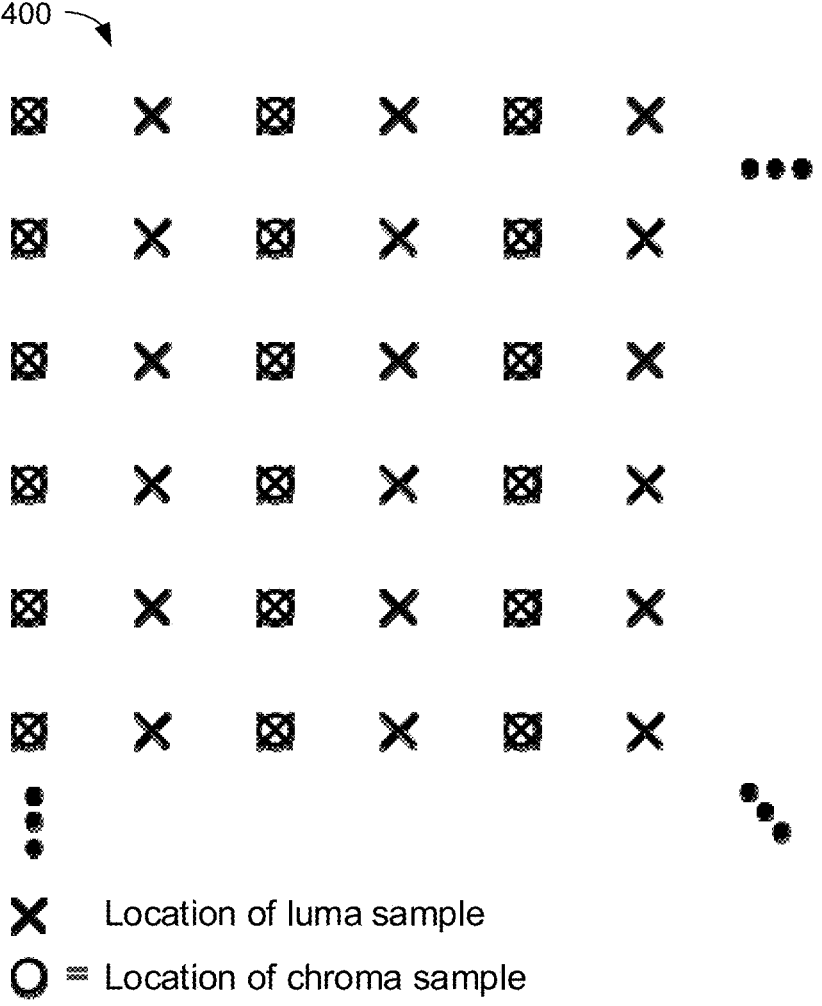
FIG. 4 illustrates nominal vertical and horizontal locations of 4:2:2 luma and chroma samples in a picture.

The two chroma components are sampled at half the sample rate of luma: the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is depicted in FIG. 4 in VVC working draft.

3.1.3 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

TABLE 3-1

| SubWidthC and SubHeightC values derived from chroma_ format_idc and separate_colour_plane_flag | | | | |
|---|---|---|---|---|
| chroma_ format_idc | separate_colour_ plane_flag | Chroma format | SubWidth C | SubHeight C |
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

3.2. Coding Flow of a Typical Video Codec

Figure 5:
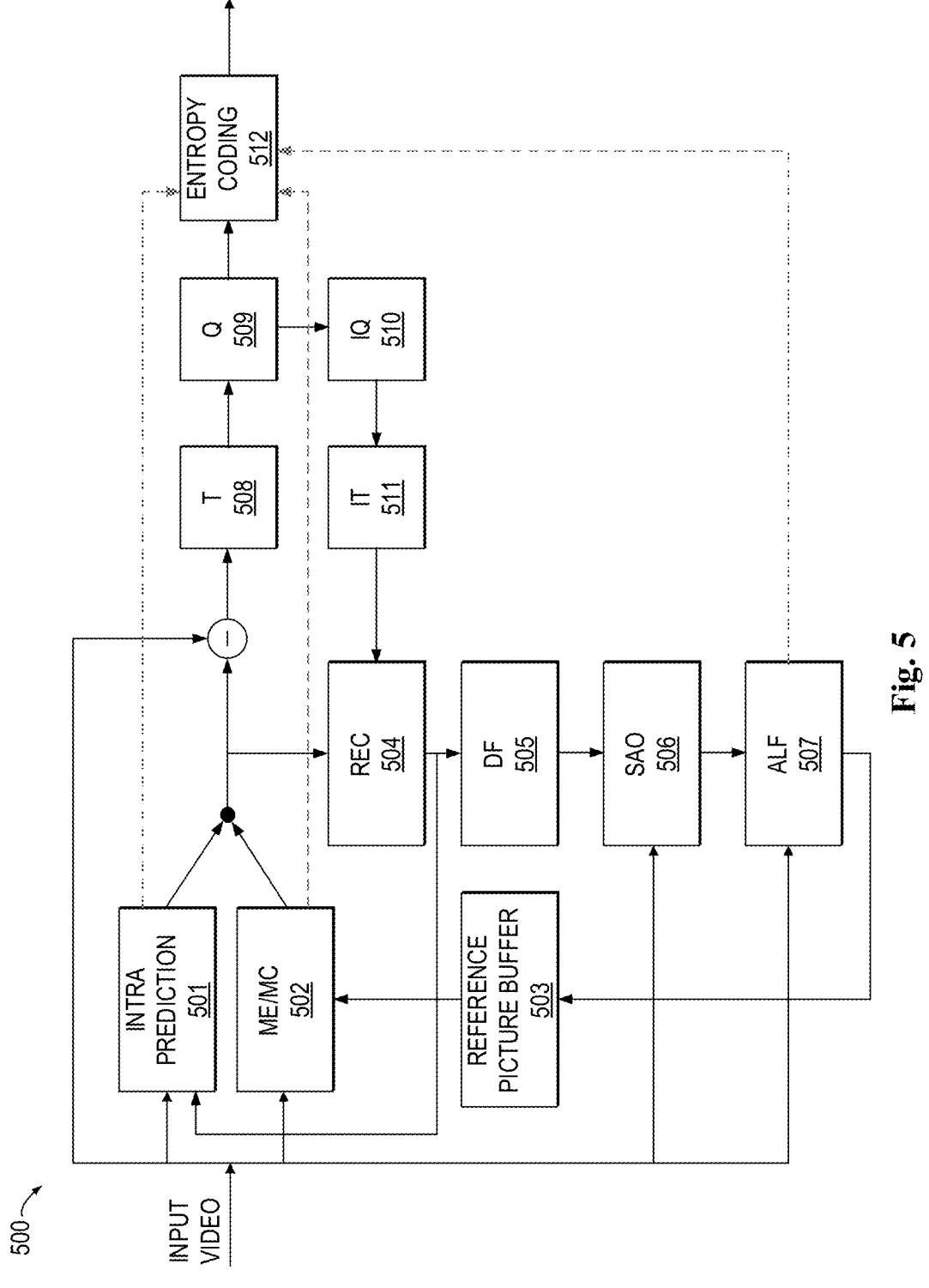
FIG. 5 illustrates a schematic diagram of example of encoder block diagram.

FIG. 5 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

3.3. Intra Prediction

To capture the arbitrary edge directions presented in natural video, the number of directional intra modes is extended from 33, as used in HEVC, to 65. The additional directional modes are depicted as red dotted arrows in FIG. 5, and the planar and DC modes remain the same. These denser directional intra prediction modes apply for all block sizes and for both luma and chroma intra predictions.

Figure 6:
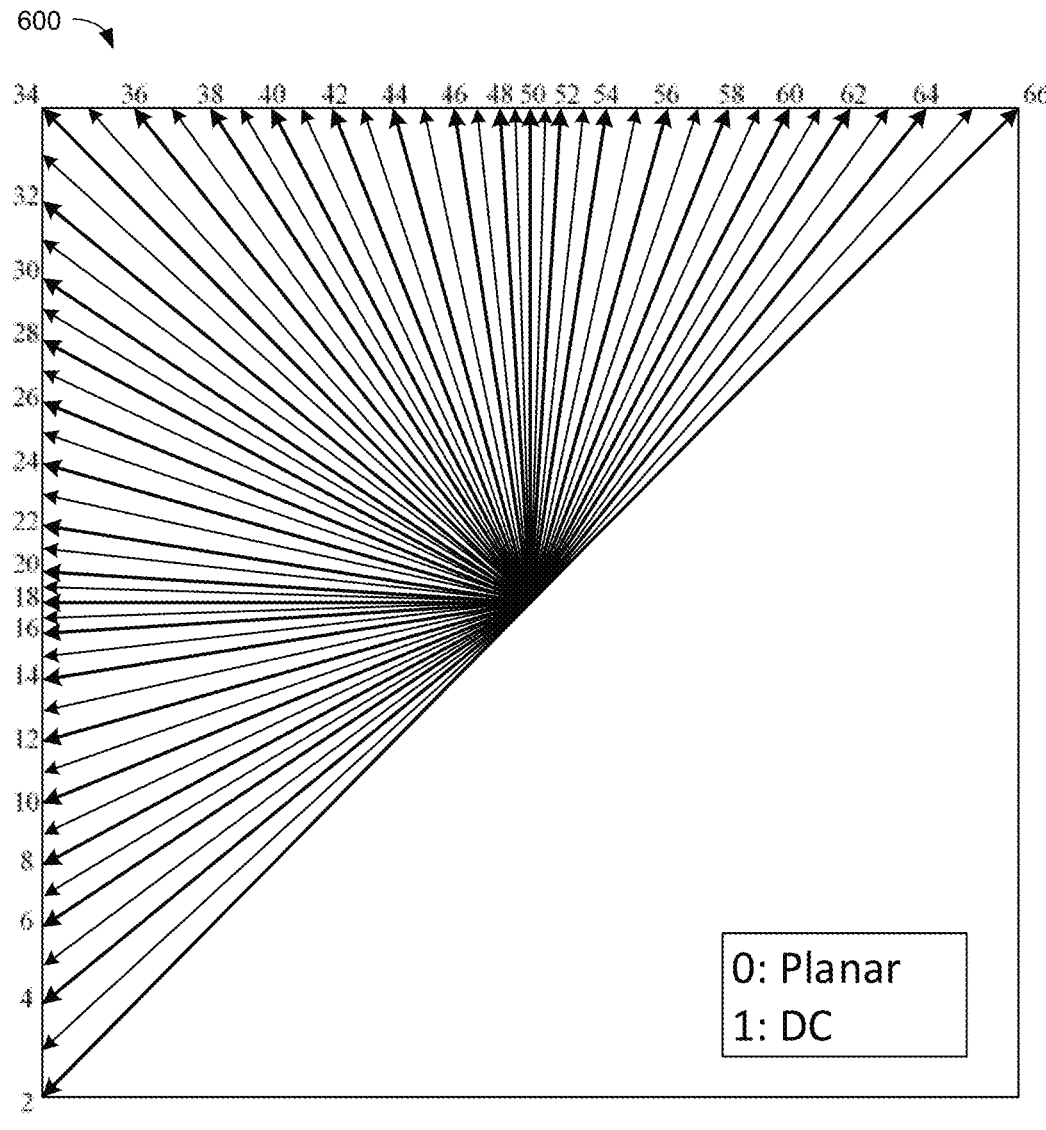
FIG. 6 illustrates a schematic diagram of 67 intra prediction modes.

Conventional angular intra prediction directions are defined from 45 degrees to −135 degrees in clockwise direction as shown in FIG. 6. In VTM, several conventional angular intra prediction modes are adaptively replaced with wide-angle intra prediction modes for the non-square blocks. The replaced modes are signalled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

3.4. Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

3.5. Deblocking Filter

Deblocking filtering typical in-loop filter in video codec. In VVC, the deblocking filtering process is applied on CU boundaries, transform subblock boundaries and prediction subblock boundaries. The prediction subblock boundaries include the prediction unit boundaries introduced by the SbTMVP (Subblock based Temporal Motion Vector prediction) and affine modes, and the transform subblock boundaries include the transform unit boundaries introduced by SBT (Subblock transform) and ISP (Intra Sub-Partitions) modes and transforms due to implicit split of large CUs. As done in HEVC, the processing order of the deblocking filter is defined as horizontal filtering for vertical edges for the entire picture first, followed by vertical filtering for horizontal edges. This specific order enables either multiple horizontal filtering or vertical filtering processes to be applied in parallel threads or can still be implemented on a CTB-by-CTB basis with only a small processing latency.

3.6. Sample Adaptive Offset

Sample adaptive offset (SAO) is applied to the reconstructed signal after the deblocking filter by using offsets specified for each CTB by the encoder. The video encoder first makes the decision on whether or not the SAO process is to be applied for current slice. If SAO is applied for the slice, each CTB is classified as one of five SAO types as shown in Table. 3-1. The concept of SAO is to classify pixels into categories and reduces the distortion by adding an offset to pixels of each category. SAO operation includes edge offset (EO) which uses edge properties for pixel classification in SAO type 1 to 4 and band offset (BO) which uses pixel intensity for pixel classification in SAO type 5. Each applicable CTB has SAO parameters including sao_merge_left_flag, sao_merge_up_flag, SAO type and four offsets. If sao_merge_left_flag is equal to 1, the current CTB will reuse the SAO type and offsets of the CTB to the left. If sao_merge_up_flag is equal to 1, the current CTB will reuse SAO type and offsets of the CTB above.

TABLE 3-2

| Specification of SAO type | | |
|---|---|---|
| SAO type | sample adaptive offset type to be used | Number of categories |
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | band offset | 4 |

3.7. Adaptive Loop Filter

Adaptive loop filtering for video coding is to minimize the mean square error between original samples and decoded samples by using Wiener-based adaptive filter. The ALF is located at the last processing stage for each picture and can be regarded as a tool to catch and fix artifacts from previous stages. The suitable filter coefficients are determined by the encoder and explicitly signalled to the decoder. To achieve better coding efficiency, especially for high resolution videos, local adaptation is used for luma signals by applying different filters to different regions or blocks in a picture. In addition to filter adaptation, filter on/off control at coding tree unit (CTU) level is also helpful for improving coding efficiency. Syntax-wise, filter coefficients are sent in a picture level header called adaptation parameter set, and filter on/off flags of CTUs are interleaved at CTU level in the slice data. This syntax design not only supports picture level optimization but also achieves a low encoding latency.

According to ALF design in VTM, filter coefficients and clipping indices are carried in ALF APSs. An ALF APS can include up to 8 chroma filters and one luma filter set with up to 25 filters. An index is also included for each of the 25 luma classes. Classes having the same index share the same filter. By merging different classes, the num of bits required to represent the filter coefficients is reduced. The absolute value of a filter coefficient is represented using a $0^{th}$ order Exp-Golomb code followed by a sign bit for a non-zero coefficient. When clipping is enabled, a clipping index is also signalled for each filter coefficient using a two-bit fixed-length code. Up to 8 ALF APSs can be used by the decoder at the same time.

Filter control syntax elements of ALF in VTM include two types of information. First, ALF on/off flags are signalled at sequence, picture, slice and CTB levels. Chroma ALF can be enabled at picture and slice level only if luma ALF is enabled at the corresponding level. Second, filter usage information is signalled at picture, slice and CTB level, if ALF is enabled at that level. Referenced ALF APSs IDs are coded at a slice level or at a picture level if all the slices within the picture use the same APSs. Luma component can reference up to 7 ALF APSs and chroma components can reference 1 ALF APS. For a luma CTB, an index is signalled indicating which ALF APS or offline trained luma filter set is used. For a chroma CTB, the index indicates which filter in the referenced APS is used.

The data syntax elements of ALF associated to LUMA component in VTM are listed as follows:

coefficients can be signalled. The value of alf_luma_num_filters_signalled_minus1 shall be in the range of 0 to NumAlfFilters−1, inclusive.

alf_luma_coeff_delta_idx[filtIdx] specifies the indices of the signalled adaptive loop filter luma coefficient deltas for the filter class indicated by filtIdx ranging from 0 to NumAlfFilters−1. When alf_luma_coeff_delta_idx[filtIdx] is not present, it is inferred to be equal to 0. The length of alf_luma_coeff_delta_idx[filtIdx] is Ceil(Log2(alf_luma_num_filters_signalled_minus1+1)) bits. The value of alf_luma_coeff_delta_idx[filtIdx] shall be in the range of 0 to alf_luma_num_filters_signalled_minus1, inclusive.

alf_luma_coeff_abs[sfIdx][j] specifies the absolute value of the j-th coefficient of the signalled luma filter indicated by sfIdx. When alf_luma_coeff_abs[sfIdx][j] is not present, it is inferred to be equal 0. The value of alf_luma_coeff_abs [sfIdx][j] shall be in the range of 0 to 128, inclusive.

alf_luma_coeff_sign[sfIdx][j] specifies the sign of the j-th luma coefficient of the filter indicated by sfIdx as follows:

If alf_luma_coeff_sign[sfIdx][j] is equal to 0, the corresponding luma filter coefficient has a positive value.

Otherwise (alf_luma_coeff_sign[sfIdx][j] is equal to 1), the corresponding luma filter coefficient has a negative value.

When alf_luma_coeff_sign[sfIdx][j] is not present, it is inferred to be equal to 0.

alf_luma_clip_idx[sfIdx][j] specifies the clipping index of the clipping value to use before multiplying by the j-th coefficient of the signalled luma filter indicated by sfIdx. When alf_luma_clip_idx[sfIdx][j] is not present, it is inferred to be equal to 0.

The coding tree unit syntax elements of ALF associated to LUMA component in VTM are listed as follows:

|  | Descriptor |
|---|---|
| alf_data( ) { |  |
|   alf_luma_filter_signal_flag | u(1) |
|   if( alf_luma_filter_signal_flag ) { |  |
|     alf_luma_clip_flag | u(1) |
|     alf_luma_num_filters_signalled_minus1 | ue(v) |
|     if( alf_luma_num_filters_signalled_minus1 > 0 ) |  |
|       for( filtIdx = 0; filtIdx < NumAlfFilters; filtIdx++ ) |  |
|         alf_luma_coeff_delta_idx[ filtIdx ] | u(v) |
|     for( sfIdx = 0; sfIdx <= alf_luma_num_filters_signalled_minus1; sfIdx++ ) |  |
|       for( j = 0; j < 12; j++ ) { |  |
|         alf_luma_coeff_abs[ sfIdx ][ j ] | ue(v) |
|         if( alf_luma_coeff_abs[ sfIdx ][ j ] ) |  |
|           alf_luma_coeff_sign[ sfIdx ][ j ] | u(1) |
|       } |  |
|     if( alf_luma_clip_flag ) |  |
|       for( sfIdx = 0; sfIdx <= alf_luma_num_filters_signalled_minus1; sfIdx++ ) |  |
|         for( j = 0; j < 12; j++ ) |  |
|           alf_luma_clip_idx[ sfIdx ][ j ] | u(2) |
|   } |  | alf_luma_filter_signal_flag equal to 1 specifies that a luma filter set is signalled. alf_luma_filter_signal_flag equal to 0 specifies that a luma filter set is not signalled.

alf_luma_clip_flag equal to 0 specifies that linear adaptive loop filtering is applied to the luma component. alf_luma_clip_flag equal to 1 specifies that non-linear adaptive loop filtering could be applied to the luma component.

alf_luma_num_filters_signalled_minus1 plus 1 specifies the number of adpative loop filter classes for which luma

|  | Descriptor |
|---|---|
| coding_tree_unit( ) { |  |
|   xCtb = CtbAddrX << CtbLog2SizeY |  |
|   yCtb = CtbAddrY << CtbLog2SizeY |  |
|   if( sh_alf_enabled_flag ){ |  |
|     alf_ctb_flag[ 0 ][ CtbAddrX ][ CtbAddrY ] | ae(v) |
|     if( alf_ctb_flag[ 0 ][ CtbAddrX ][ CtbAddrY ] ) { |  |
|       if( sh_num_alf_aps_ids_luma > 0 ) |  |
|         alf_use_aps_flag | ae(v) |

-continued

| | Descriptor |
|---|---|
| if( alf_use_aps_flag ) { | |
| if( sh_num_alf_aps_ids_luma > 1 ) | |
| alf_luma_prev_filter_idx | ae(v) |
| } else | |
| alf_luma_fixed_filter_idx | ae(v) |
| } | |
| } | | alf_ctb_flag[cIdx][xCtb>>CtbLog2SizeY] [yCtb>>CtbLog2SizeY] equal to 1 specifies that the adaptive loop filter is applied to the coding tree block of the colour component indicated by cIdx of the coding tree unit at luma location (xCtb, yCtb). alf_ctb_flag[cIdx]

[xCtb>>CtbLog2SizeY][yCtb>>CtbLog2SizeY] equal to 0 specifies that the adaptive loop filter is not applied to the coding tree block of the colour component indicated by cIdx of the coding tree unit at luma location (xCtb, yCtb).

When alf_ctb_flag[cIdx][xCtb>>CtbLog2SizeY] [yCtb>>CtbLog2SizeY] is not present, it is inferred to be equal to 0.

alf_use_aps_flag equal to 0 specifies that one of the fixed filter sets is applied to the luma CTB. alf_use_aps_flag equal to 1 specifies that a filter set from an APS is applied to the luma CTB. When alf_use_aps_flag is not present, it is inferred to be equal to 0.

alf_luma_prev_filter_idx specifies the previous filter that is applied to the luma CTB. The value of alf_luma_prev_filter_idx shall be in a range of 0 to sh_num_alf_aps_ids_luma−1, inclusive. When alf_luma_prev_filter_idx is not present, it is inferred to be equal to 0.

The variable AlfCtbFiltSetIdxY[xCtb>>CtbLog2SizeY] [yCtb>>CtbLog2SizeY] specifying the filter set index for the luma CTB at location (xCtb, yCtb) is derived as follows:

If alf_use_aps_flag is equal to 0, AlfCtbFiltSetIdxY [xCtb>>CtbLog2SizeY][yCtb>>CtbLog2SizeY] is set equal to alf_luma_fixed_filter_idx.

Otherwise, AlfCtbFiltSetIdxY[xCtb>>CtbLog2Size Y][yCtb>>CtbLog2SizeY] is set equal to 16+alf_luma_prev_filter_idx.

alf_luma_fixed_filter_idx specifies the fixed filter that is applied to the luma CTB. The value of alf_luma_fixed_filter_idx shall be in a range of 0 to 15, inclusive.

Based on the ALF design of VTM, the ALF design of ECM further introduces the concept of alternative filter sets into luma filters. The luma filters are be trained multiple alternatives/rounds based on the updated luma CTU ALF on/off decisions of each alternative/round. In such way, there will be multiple filter-sets that associated to each training alternative and the class merging results of each filter set may be different. Each CTU could select the best filter set by RDO and the related alternative information will be signaled.

The data syntax elements of ALF associated to LUMA component in ECM are listed as follows:

| | Descriptor |
|---|---|
| alf_data( ) { | |
| alf_luma_filter_signal_flag | u(1) |
| if( alf_luma_filter_signal_flag ) { | |
| alf_luma_num_alts_minus1 | ue(v) |
| for(altIdx = 0; altIdx < alf_luma_num_alts_minus1 +1; altIdx++){ | |
| alf_luma_clip_flag[altIdx] | u(1) |
| alf_luma_num_filters_signalled_minus1[altIdx] | ue(v) |
| if(alf_luma_num_filters_signalled_minus1[altIdx] > 0){ | |
| for( filtIdx = 0; filtIdx < NumAlfFilters; filtIdx++ ) | |
| alf_luma_coeff_delta_idx[altIdx][filtIdx] | u(v) |
| } | |
| for(sfIdx = 0; sfIdx <= alf_luma_num_filters_signalled_minus1[altIdx]; sfIdx++){ | |
| for(j = 0; j < 19; j++){ | |
| alf_luma_coeff_abs[altIdx][ sfIdx ][ j ] | ue(v) |
| if( alf_luma_coeff_abs[altIdx][ sfIdx ][ j ] ) | |
| alf_luma_coeff_sign[altIdx][ sfIdx ][ j ] | u(1) |
| } | |
| } | |
| if( alf_luma_clip_flag [altIdx]) | |
| for( sfIdx = 0; sfIdx <= alf_luma_num_filters_signalled_minus1[altIdx]; sfIdx++ ) | |
| for( j= 0; j <19; j++ ) | |
| alf_luma_clip_idx[altIdx][ sfIdx ][ j ] | u(2) |
| } | |
| } | | alf_luma_num_alts_minus1 plus 1 specifies the number of alternative filter sets for luma component. The value of alf_luma_num_alts_minus1 shall be in the range of 0 to 3, inclusive.

alf_luma_clip_flag[altIdx] equal to 0 specifies that linear adaptive loop filtering is applied to the alternative luma filter set with index altIdx. alf_luma_clip_flag[altIdx] equal to 1 specifies that non-linear adaptive loop filtering could be applied to the alternative luma filter set with index altIdx.

alf_luma_num_filters_signalled_minus1 [altIdx] plus 1 specifies the number of adpative loop filter classes for which luma coefficients can be signalled of the alternative luma filter set with index altIdx. The value of alf_luma_num_filters_signalled_minus1 [altIdx] shall be in the range of 0 to NumAlfFilters−1, inclusive.

alf_luma_coeff_delta_idx[altIdx][filtIdx] specifies the indices of the signalled adaptive loop filter luma coefficient deltas for the filter class indicated by filtIdx ranging from 0 to NumAlfFilters−1 for the alternative luma filter set with index altIdx. When alf_luma_coeff_delta_idx[filtIdx][altIdx] is not present, it is inferred to be equal to 0. The length of alf_luma_coeff_delta_idx[altIdx][filtIdx] is Ceil(Log2 (alf_luma_num_filters_signalled_minus1[altIdx]+1)) bits. The value of alf_luma_coeff_delta_idx[altIdx][filtIdx] shall be in the range of 0 to alf_luma_num_filters_signalled_minus1 [altIdx], inclusive.

alf_luma_coeff_abs[altIdx][sfIdx][j] specifies the absolute value of the j-th coefficient of the signalled luma filter indicated by sfIdx of the alternative luma filter set with index altIdx. When alf_luma_coeff_abs[altIdx][sfIdx][j] is not present, it is inferred to be equal 0. The value of alf_luma_coeff_abs[altIdx][sfIdx][j] shall be in the range of 0 to 128, inclusive.

alf_luma_coeff_sign[altIdx][sfIdx][j] specifies the sign of the j-th luma coefficient of the filter indicated by sfIdx of the alternative luma filter set with index altIdx as follows:

If alf_luma_coeff_sign[altIdx][sfIdx][j] is equal to 0, the corresponding luma filter coefficient has a positive value.

Otherwise (alf_luma_coeff_sign[altIdx][sfIdx][j] is equal to 1), the corresponding luma filter coefficient has a negative value.

When alf_luma_coeff_sign[altIdx][sfIdx][j] is not present, it is inferred to be equal to 0.

alf_luma_clip_idx[altIdx][sfIdx][j] specifies the clipping index of the clipping value to use before multiplying by the j-th coefficient of the signalled luma filter indicated by sfIdx of the alternative luma filter set with index altIdx. When alf_luma_clip_idx[altIdx][sfIdx][j] is not present, it is inferred to be equal to 0.

The coding tree unit syntax elements of ALF associated to LUMA component in ECM are listed as follows:

|  | Descriptor |
|---|---|
| coding_tree_unit( ) { | |
| xCtb = CtbAddrX << CtbLog2SizeY | |
| yCtb = CtbAddrY << CtbLog2SizeY | |
| if( sh_alf_enabled_flag ){ | |
| alf_ctb_flag[ 0 ][ CtbAddrX ][ CtbAddrY ] | ae(v) |
| if( alf_ctb_flag[ 0 ][ CtbAddrX ][ CtbAddrY ] ) { | |
| if( sh_num_alf_aps_ids_luma > 0 ) | |
| alf_use_aps_flag | ae(v) |
| if( alf_use_aps_flag ) { | |
| if( sh_num_alf_aps_ids_luma > 1 ) | |
| alt_ctb_luma_filter_alt_idx[CtbAddrX][CtbAddrY] | ae(v) |
| alf_luma_prev_filter_idx | ae(v) |
| } else | |
| alf_luma_fixed_filter_idx | ae(v) |
| } | |
| } | | alf_ctb_luma_filter_alt_idx[xCtb>>CtbLog2Size Y][yCtb>>CtbLog2SizeY] specifies the index of the alternative luma filters applied to the coding tree block of the luma component, of the coding tree unit at luma location (xCtb, yCtb). When alf_ctb_luma_filter_alt_idx[xCtb>>CtbLog2Size Y][yCtb>>CtbLog2Size Y] is not present, it is inferred to be equal to zero.

3.8. Bilateral In-loop Filter 3.8.1 Bilateral Image Filter

Bilateral image filter is a nonlinear filter that smooths the noise while preserving edge structures. The bilateral filtering is a technique to make the filter weights decrease not only with the distance between the samples but also with increasing difference in intensity. This way, over-smoothing of edges can be ameliorated. A weight is defined as $$w(\Delta x, \Delta y, \Delta I) = e^{-\frac{\Delta x^2 + \Delta y^2}{2\sigma_d^2} - \frac{\Delta I^2}{2\sigma_r^2}}$$

where $\Delta x$ and $\Delta y$ is the distance in the vertical and horizontal and $\Delta I$ is the difference in intensity between the samples.

The edge-preserving de-noising bilateral filter adopts a low-pass Gaussian filter for both the domain filter and the range filter. The domain low-pass Gaussian filter gives higher weight to pixels that are spatially close to the center pixel. The range low-pass Gaussian filter gives higher weight to pixels that are similar to the center pixel. Combining the range filter and the domain filter, a bilateral filter at an edge pixel becomes an elongated Gaussian filter that is oriented along the edge and is greatly reduced in gradient direction. This is the reason why the bilateral filter can smooth the noise while preserving edge structures.

3.8.2 Bilateral Filter in Video Coding

The bilateral filter in video coding is proposed as a coding tool for the VVC. The filter acts as a loop filter in parallel with the sample adaptive offset (SAO) filter. Both the bilateral filter and SAO act on the same input samples, each filter produces an offset, and these offsets are then added to the input sample to produce an output sample that, after clipping, goes to the next stage. The spatial filtering strength $\sigma_d$ is determined by the block size, with smaller blocks filtered more strongly, and the intensity filtering strength $\sigma_r$ is determined by the quantization parameter, with stronger filtering being used for higher QPs. Only the four closest samples are used, so the filtered sample intensity $I_F$ can be calculated as $$I_F = I_C + \frac{w_A \Delta I_A + w_B \Delta I_B + w_L \Delta I_L + w_R \Delta I_R}{w_C + w_A + w_B + w_L + w_R}$$

where $I_C$ denotes the intensity of the center sample, $\Delta I_A = I_A - I_C$ the intensity difference between the center sample and the sample above. $\Delta I_B$, $\Delta I_L$ and $\Delta I_R$ denote the intensity difference between the center sample and that of the sample below, to the left and to the right respectively.

4. Problems

The existing designs for adaptive loop filter in video coding have the following problems:

1) In current ALF design, a fixed filter shape is used for online-trained filters or offline-trained filters. The performance of ALF may be further improved by using filter shape selection.

2) In current ALF design, an APS only contains filters with one filter shape for each color component. The performance of ALF may be further improved by storing filters with different shapes.

5. Exemplary Embodiments

To solve the above problems and some other problems not mentioned, methods as summarized below are disclosed. The embodiments should be considered as examples to explain the general concepts and should not be interpreted in a narrow way. Furthermore, these embodiments can be applied individually or combined in any manner.

It should be noted that the proposed methods may be used as in-loop filters or post-processing. In this disclosure, a video unit may refer to a sequence, a picture, a sub-picture, a slice, a CTU, a block or a region. The video unit may comprise one color component or it may comprise multiple color components.

In this disclosure, an ALF processing unit may refer to a sequence, a picture, a sub-picture, a slice, a CTU, a block, a region, or a sample. The ALF processing unit may comprise one color component or it may comprise multiple color components.

1) It is proposed to apply multiple filter shapes within a video unit which is mentioned as filter shape selection method in the following bullets.

a. In one example, for two samples within a video unit, the filter shapes to be applied may be different.

b. In one example, for two CTU/CTBs, the filter shapes to be applied may be different.

c. In one example, for two regions within the video unit (e.g., a slice/tile/subpicture/picture), the filter shapes to be applied may be different.

d. Alternatively, furthermore, which filter shape to be selected from the multiple filter shapes may be signalled or inherited or derived on-the-fly.

e. In one example, a filter shape may represent which neighboring samples (adjacent or non-adjacent) to be involved in the filtering process of current sample.

a) Alternatively, a filter shape may represent how many neighboring samples are involved.

b) Two filtering methods with different filter taps may also be treated as two different filter shapes (even the filter coefficients for certain locations could be treated to be equal to 0).

1. For example, diamond 5*5 is treated as a different filter shape from diamond 7*7.

2. For example, diamond 5*5 is treated as a different filter shape from limited square 5*5 even filter taps are the same.

f. In one example, indications of filter shapes may be signalled in a bitstream, e.g., in the ALF APS.

a) Alternatively, furthermore, for a video unit to be filtered, when the filter coefficients are inherited/predicted from a given ALF APS, the associated filter shape of the ALF APS may be also inherited.

2) In one example, the proposed/described filter shape selection method may be applied to any in-loop filtering tools, pre-processing or post-processing filtering method in video coding (including but not limited to ALF/CCALF or any other filtering method).

a. In one example, the proposed filter shape selection method may be applied to an in-loop filtering method.

a) In one example, the proposed filter shape selection method may be applied to ALF.

b) In one example, the proposed filter shape selection method may be applied to CCALF.

c) Alternatively, the proposed filter shape selection method may be applied to other in-loop filtering methods.

b. In one example, the proposed filter shape selection method may be applied to a pre-processing filtering methods.

c. In one example, the proposed filter shape selection method may be applied to a post-processing filtering methods.

3) The online-trained filters (e.g., the derived filters according to least square error between reconstruction and original samples) may have multiple sets of filter coefficients and each set may correspond to one or multiple filter shapes.

a. In one example, the online-trained filters for a LUMA component may use multiple filter shape candidates.

b. In one example, the online-trained filters for a CHROMA component may use multiple filter shape candidates.

c. In one example, the encoder may collect training data for each shape candidate.

a) In one example, the collected data may be used individually for training each shape candidate.

b) In one example, the collected data may be used jointly for training each shape candidate.

d. In one example, the class merging may be performed on multiple filter shapes.

a) In one example, the class merging may be performed on each shape candidate individually.

b) In one example, the class merging may be performed on each shape candidate jointly.

c) Alternatively, the class merging results may be reused between shape candidates.

e. In one example, the training alternative number/round may be decided for each shape candidate.

a) In one example, the training alternative number/round may be decided for each shape candidate individually.

b) In one example, the training alternative number/round may be decided for each shape candidate jointly.

c) Alternatively, the training alternative number/round may be reused between different shape candidates.

f. In one example, the online-trained filters with different shapes may use one or more extra/virtual taps for training and filtering.

a) In one example, an extra/virtual tap may use other input instead of a sample that located at a specific position in the spatial domain.

1. In one example, an extra/virtual tap may use the intermediate filtering result of an online-trained filter as input.

2. In one example, an extra/virtual tap may use the intermediate filtering result of an offline-trained filter as input.

3. In one example, an extra/virtual tap may use the intermediate result that generated by a coding tool as input.

4. Alternatively, an extra/virtual tap may use a derived/determined on the fly value as input.

b) In one example, each shape candidate may use the intermediate filtering results from the offline-trained filters with an identical shape as the extra/virtual taps.

c) In one example, each shape candidate may use the intermediate filtering results from the offline-trained filters with different shapes as the extra/virtual taps.

d) In one example, each shape candidate may use the intermediate filtering results from other online-trained filters with an identical shape as extra/virtual taps.

e) In one example, each shape candidate may use the intermediate filtering results from other online-trained filters with different shapes as the extra/virtual taps.

4) The offline-trained filters (e.g., the fixed filters in GALF of VVC) may have multiple sets of filter coefficients and each set may correspond to one or multiple filter shapes.

a. In one example, the offline-trained filters for a LUMA component may have multiple filter shape candidates.

b. In one example, the offline-trained filters for CHROMA components may have multiple filter shape candidates.

5) Different sets of samples may use filters with different filter shapes.

a. A set of samples may correspond to an ALF processing unit, such as a CTU/CTB.

a) Alternatively, a set of samples may correspond to samples in a picture or a slice or a sub-picture or a sequence.

b) Alternatively, a set of samples may correspond to samples in a specific band, such as samples with values in the range of [Smin, Smax].

b. In one example, a filter shape index may be signaled/derived/determined on the fly for each ALF processing unit.

c. In one example, an on/off control flag may be signaled/derived/determined on the fly for each ALF processing unit.

d. In one example, an alternative number index may be signaled/derived/determined on the fly for each ALF processing unit.

6) A first syntax element may be signaled to indicate the filter shape.

a. In one example, the first syntax element may be coded by arithmetic coding a) In one example, the first syntax element may be coded with at least one context.

1. The context may depend on coding information of the current block or neighbouring block.

2. The context may depend on the filtering shape of at least one neighbouring block.

b) In one example, the first syntax element may be coded with bypass coding.

b. In one example, the first syntax element may be binarized by unary code, or truncated unary code, or fixed-length code, or exponential Golomb code, truncated exponential Golomb code, etc.

c. In one example, the first syntax element may be signaled conditionally.

a) For example, the first syntax element may be signaled only if the number of available filter shapes is at least two.

d. The first syntax element may be coded in a predictive way.

a) The first syntax element may be predicted by the filtering shape of at least one neighbouring block.

e. The first syntax element may be signaled independently for different color components.

a) Alternatively, the first syntax element may be signaled and shared for different color components.

b) Alternatively, the first syntax element may be signaled for a first color component but not signaled for a second color component.

7) A syntax element structure (such as an APS) may contain filters with one or more filter shapes for different color components. In the following discussion, APS may be used to represent the syntax element structure.

a. In one example, a syntax element structure may contain filters with an identical filter shape for LUMA component.

a) In one example, a LUMA shape candidate index may be signaled in a syntax element structure.

b) In one example, the number of enabled LUMA filters with the selected filter shape candidate may be signaled in the syntax element structure.

c) In one example, the class merging results of the filters with the selected filter shape candidate may be signaled in the syntax element structure.

d) In one example, the coefficients of LUMA filters with the selected filter shape candidate may be signaled in the syntax element structure.

b. In one example, a syntax element structure may contain filters with an identical filter shape for CHROMA components.

a) In one example, a CHROMA shape candidate index may be signaled in the syntax element structure.

b) In one example, the number of enabled CHROMA filters with the selected filter shape candidate may be signaled in the syntax element structure.

c) In one example, the class merging results of the selected shape candidate may be signaled in the syntax element structure.

d) In one example, the coefficients of CHROMA filters with the selected filter shape candidate may be signaled in the syntax element structure.

c. In one example, a syntax element structure (such as an APS) may contain filters with different filter shapes for LUMA component.

a) In one example, the filter shape indices of each filter may be signaled.

1. In one example, the filter shape indices of each filter set with different filter shapes may be signaled in the syntax element structure.

b) In one example, the number of enabled filters associated with a filter shape index may be signaled in the syntax element structure.

1. In one example, the number of enabled filters of each filter set that associated with a filter shape index may be signaled in the syntax element structure.

c) In one example, the class merging results may be signaled in the syntax element structure.

1. In one example, the class merging results of each filter set that associated with a filter shape index may be signaled in the syntax element structure.

d) In one example, the coefficients of each enabled filter may be signaled in the syntax element structure.

1. In one example, the coefficients of each filter set that associated with a filter shape index may be signaled in the syntax element structure.

d. In one example, a syntax element structure may contain filters with different filter shapes for CHROMA components.

a) In one example, the filter shape indices of each filter may be signaled.

1. In one example, the filter shape indices of each filter set that associated with a filter shape index may be signaled in the syntax element structure.

b) In one example, the number of enabled filters may be signaled in the syntax element structure.

1. In one example, the number of enabled filters of each filter set that associated with a filter shape index may be signaled in the syntax element structure.

c) In one example, the class merging results may be signaled in the syntax element structure.

1. In one example, the class merging results of each filter set that associated with a filter shape index may be signaled in the syntax element structure.

d) In one example, the coefficients of each enabled filter may be signaled in the syntax element structure.

1. In one example, the coefficients of each filter set that associated with a filter shape index may be signaled in the APS.

e. In one example, a syntax element structure may contain filters with an identical filter shape for other color components.

f. In one example, a syntax element structure may contain filters with different filter shapes for other color components.

Figure 7:
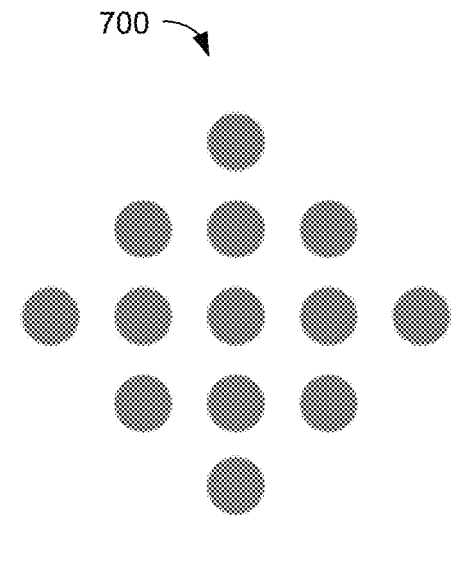
FIG. 7 illustrates a diamond shape with a size of 5×5.
Figure 8:
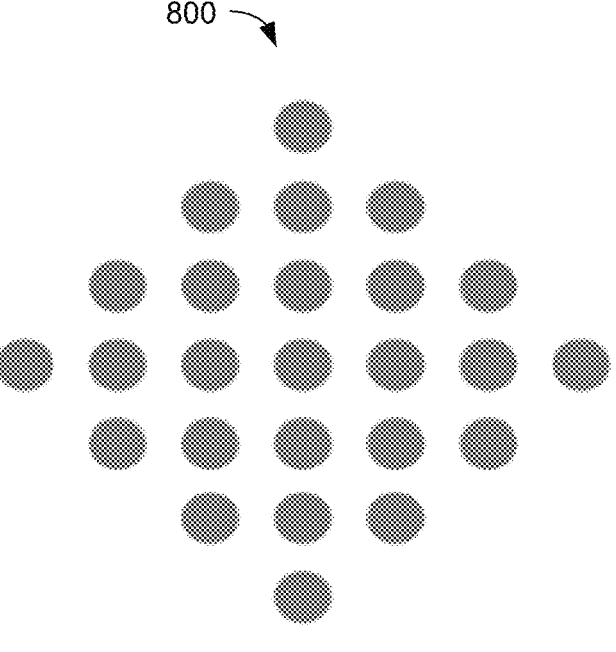
FIG. 8 illustrates a diamond shape with a size of 7×7.
Figure 9:
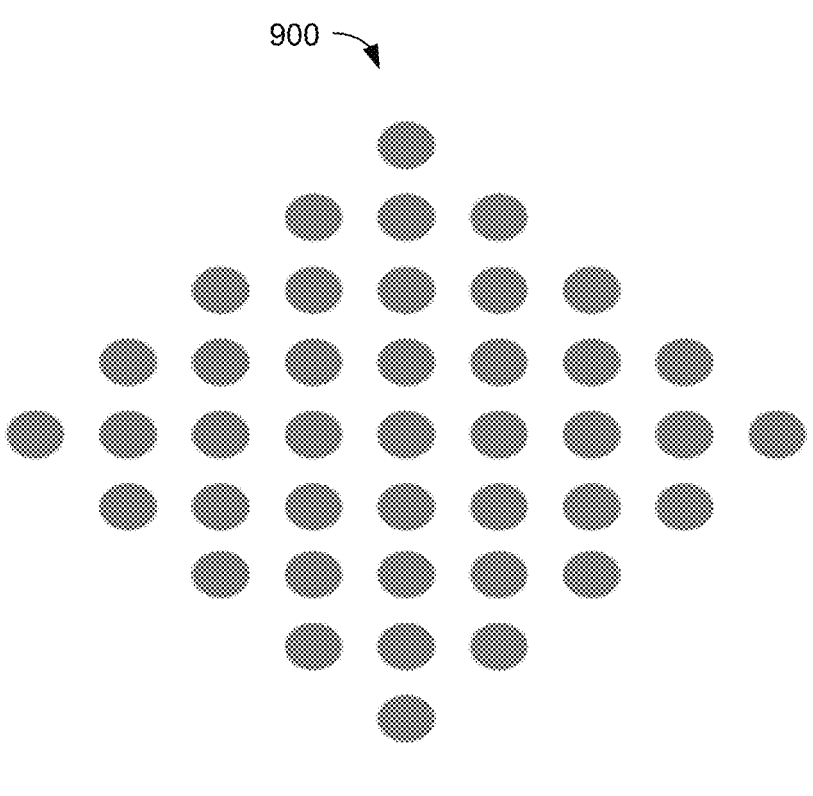
FIG. 9 illustrates a diamond shape with a size of 9×9.
Figure 10:
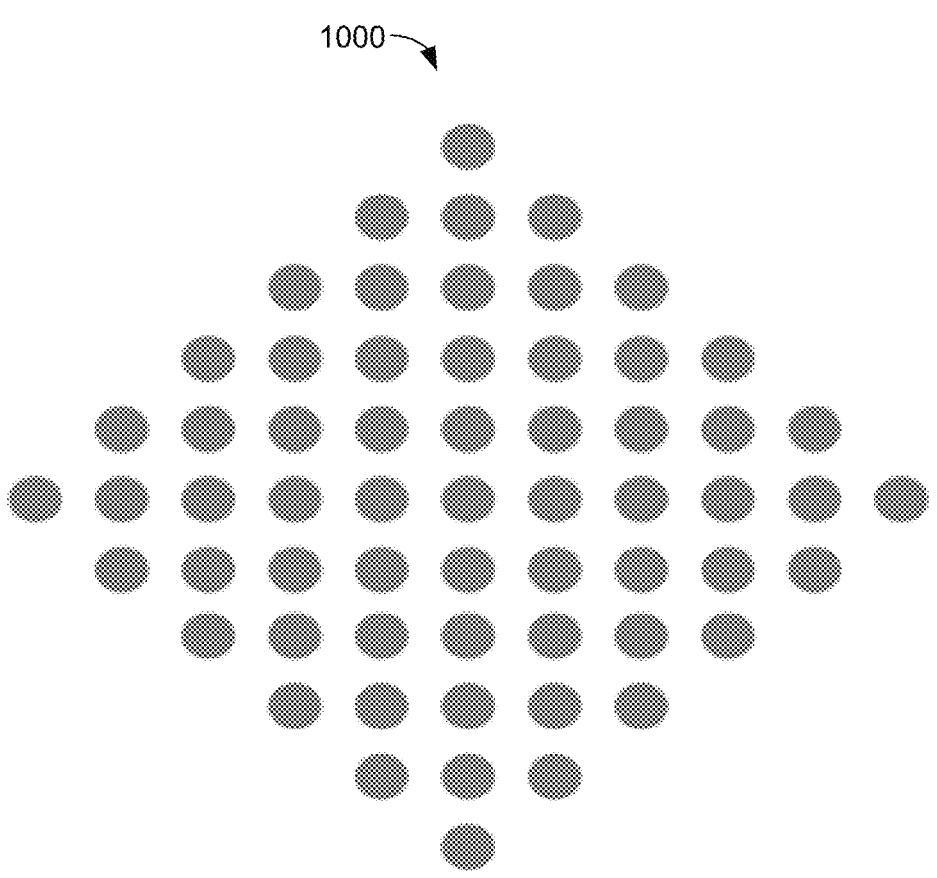
FIG. 10 illustrates a diamond shape with a size of 11×11.
Figure 11:
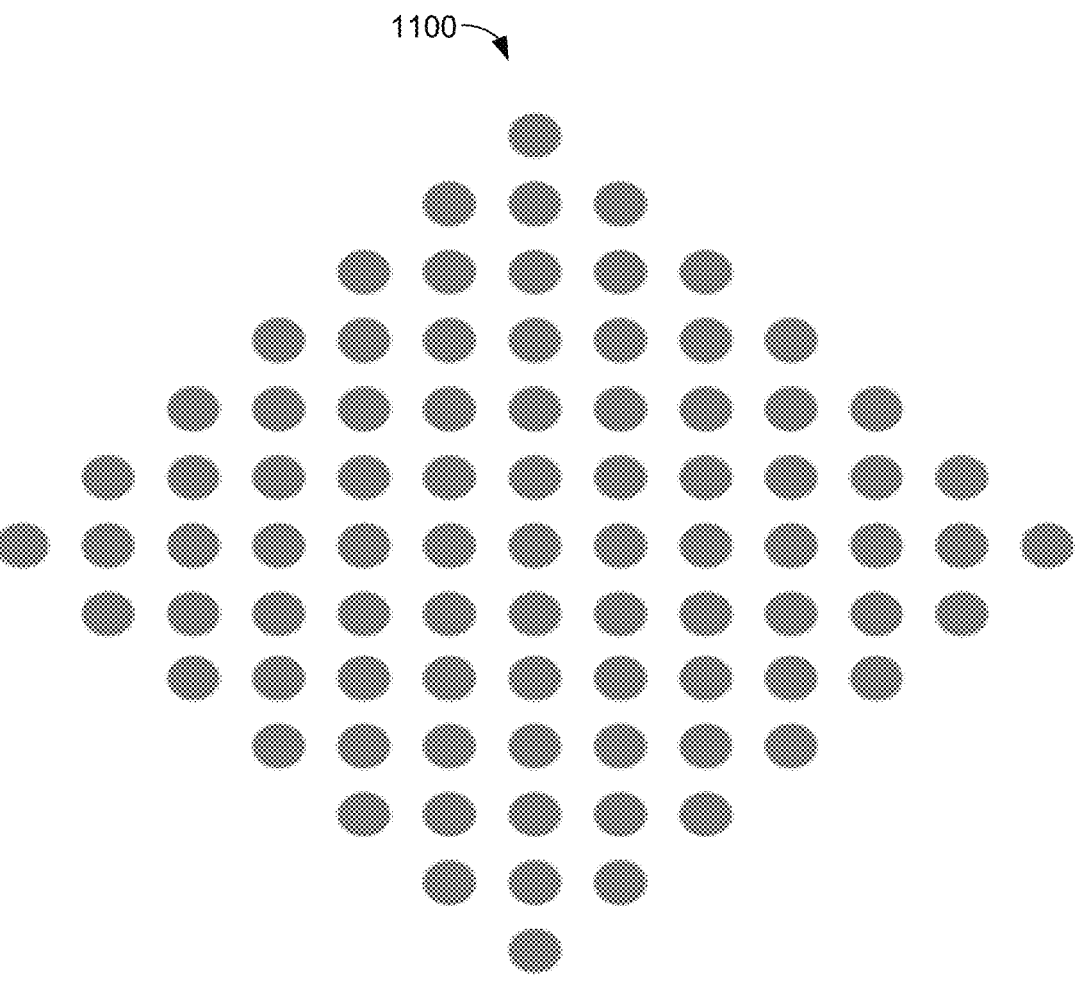
FIG. 11 illustrates a diamond shape with a size of 13×13.
Figure 12:
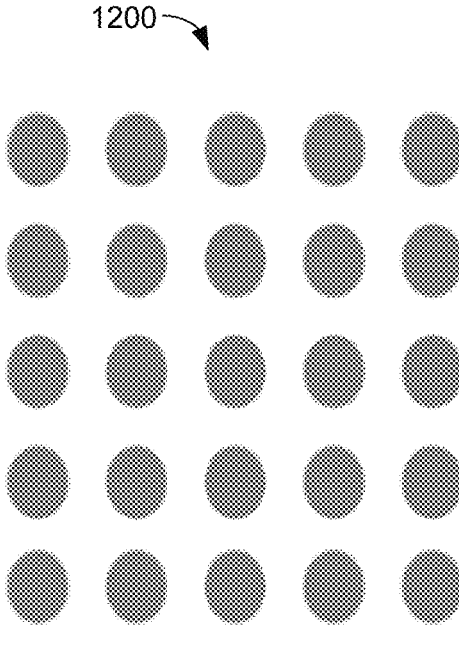
FIG. 12 illustrates a square shape with a size of 5×5.
Figure 13:
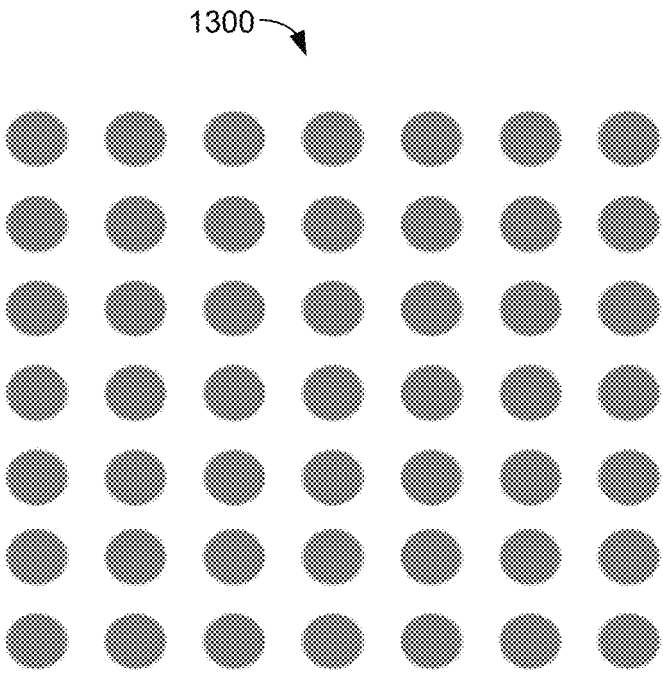
FIG. 13 illustrates a square shape with a size of 7×7.
Figure 14:
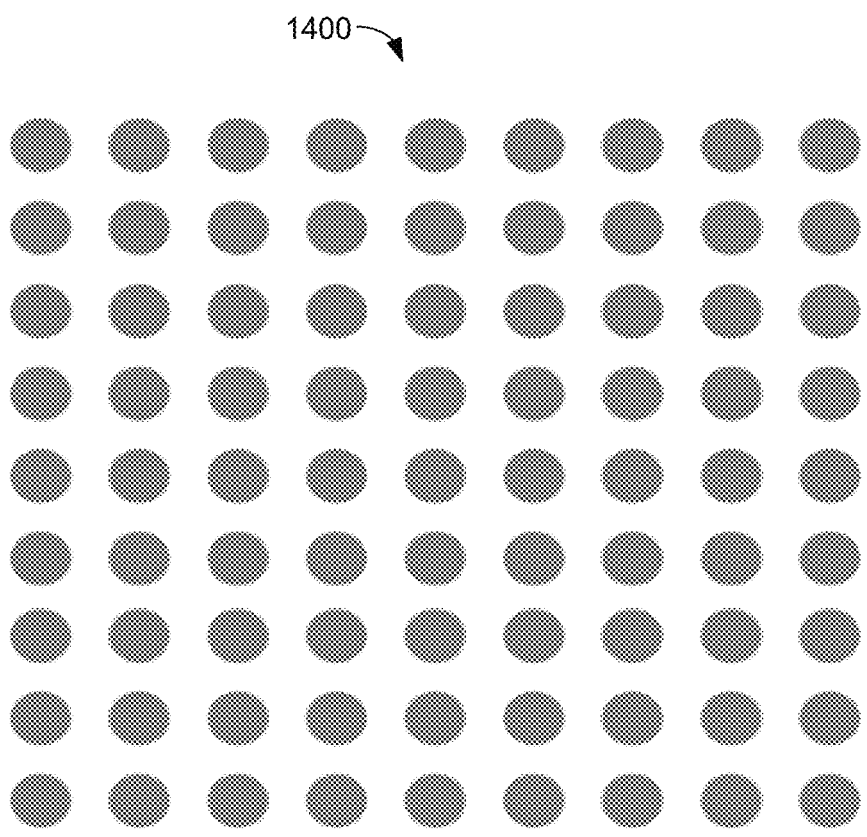
FIG. 14 illustrates a square shape with a size of 9×9.
Figure 15:
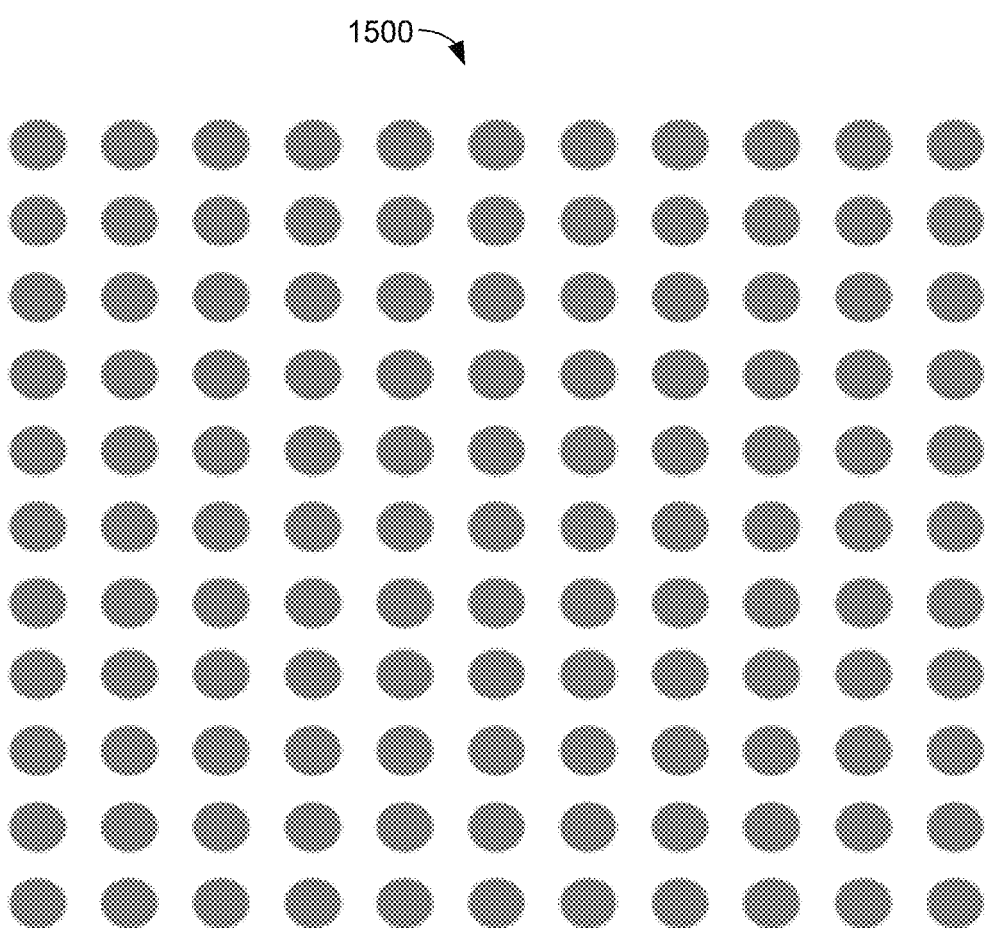
FIG. 15 illustrates a square shape with a size of 11×11.
Figure 16:
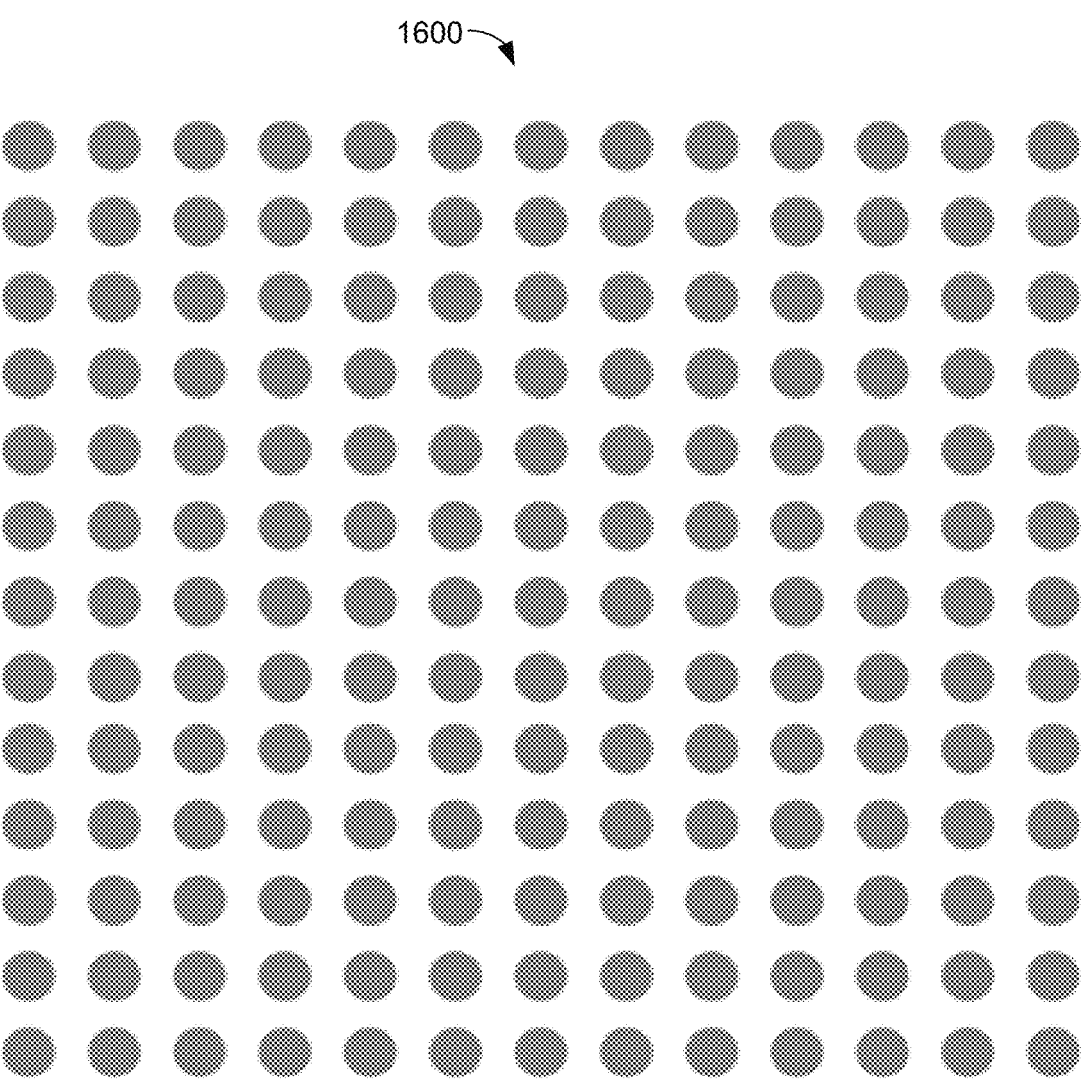
FIG. 16 illustrates a square shape with a size of 13×13.
Figure 17:
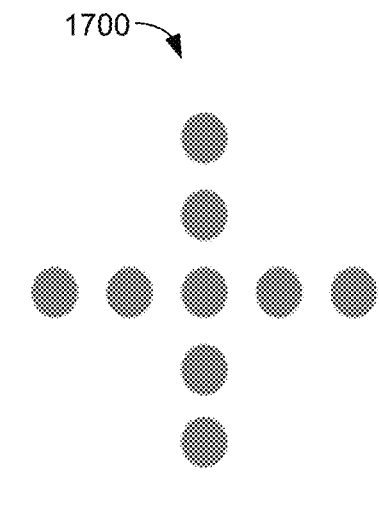
FIG. 17 illustrates a cross shape with a size of 5×5.
Figure 18:
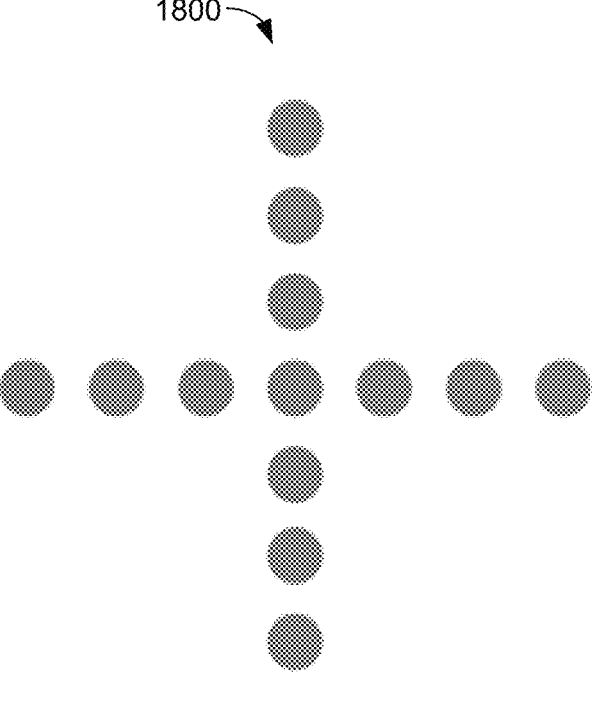
FIG. 18 illustrates a cross shape with a size of 7×7.
Figure 19:
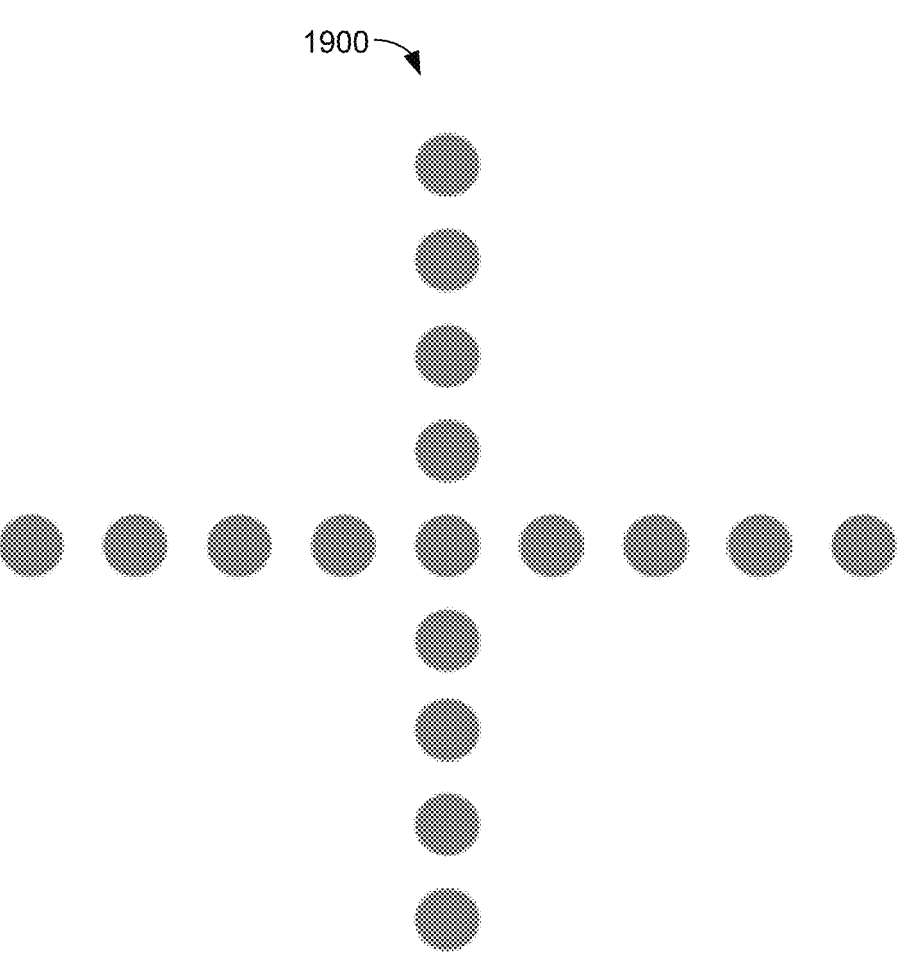
FIG. 19 illustrates a cross shape with a size of 9×9.
Figure 20:
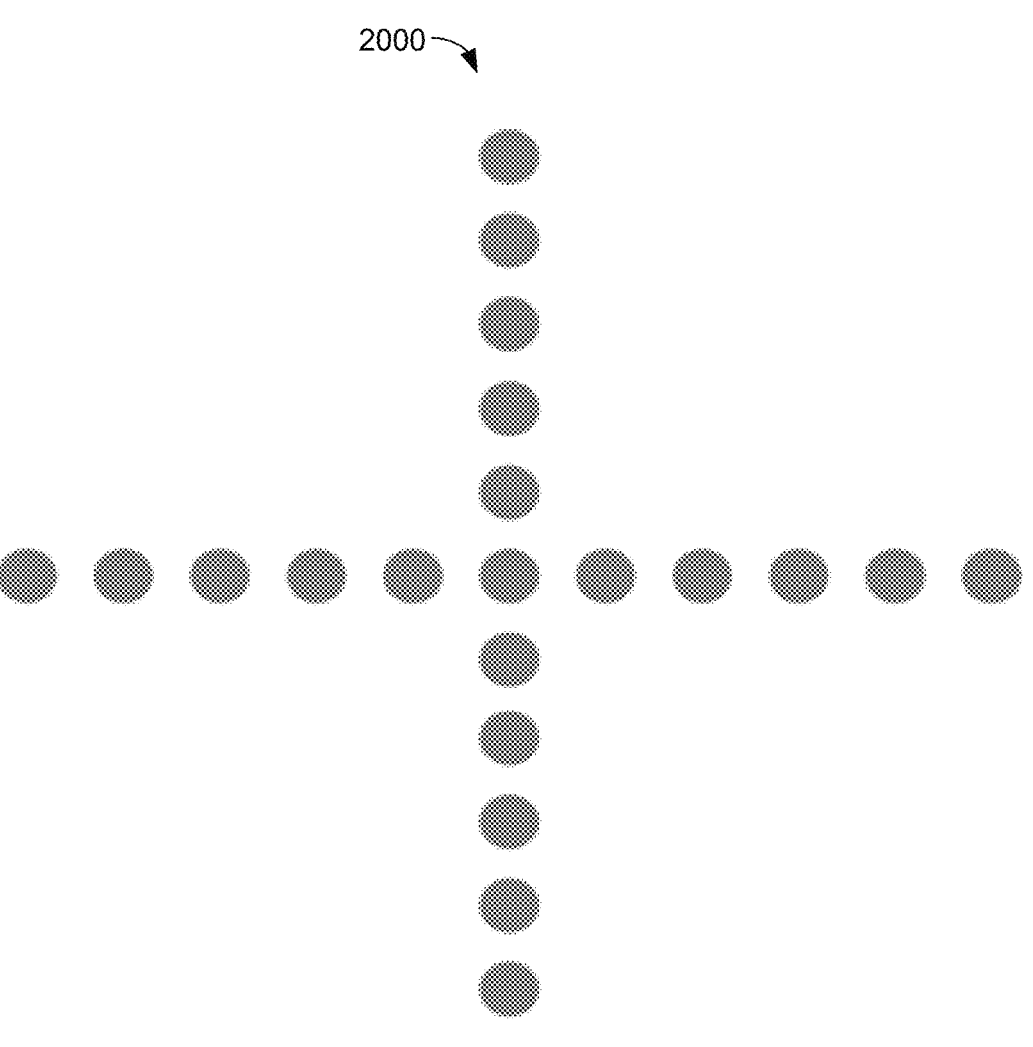
FIG. 20 illustrates a cross shape with a size of 11×11.
Figure 21:
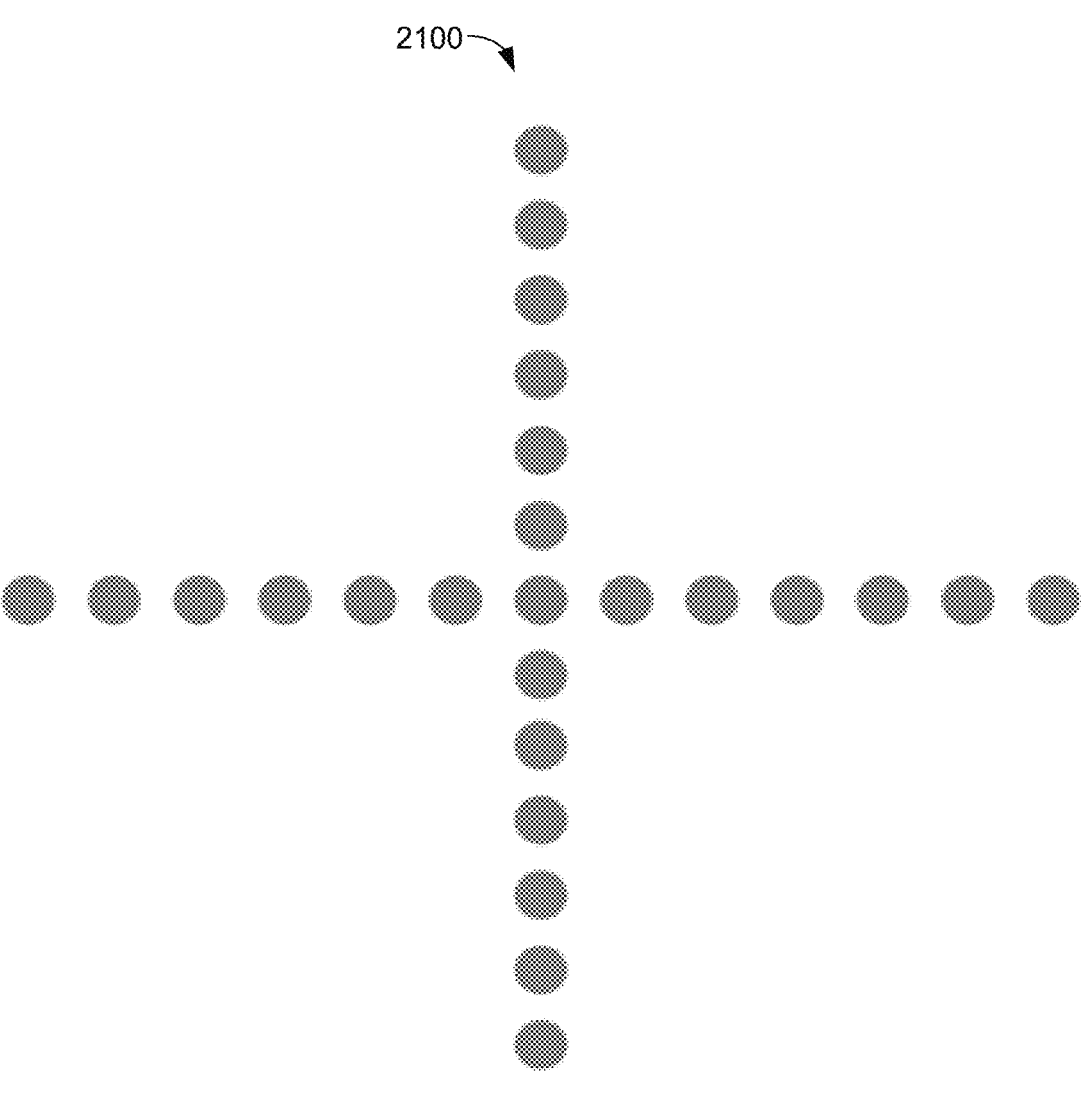
FIG. 21 illustrates a cross shape with a size of 13×13.
Figure 22:
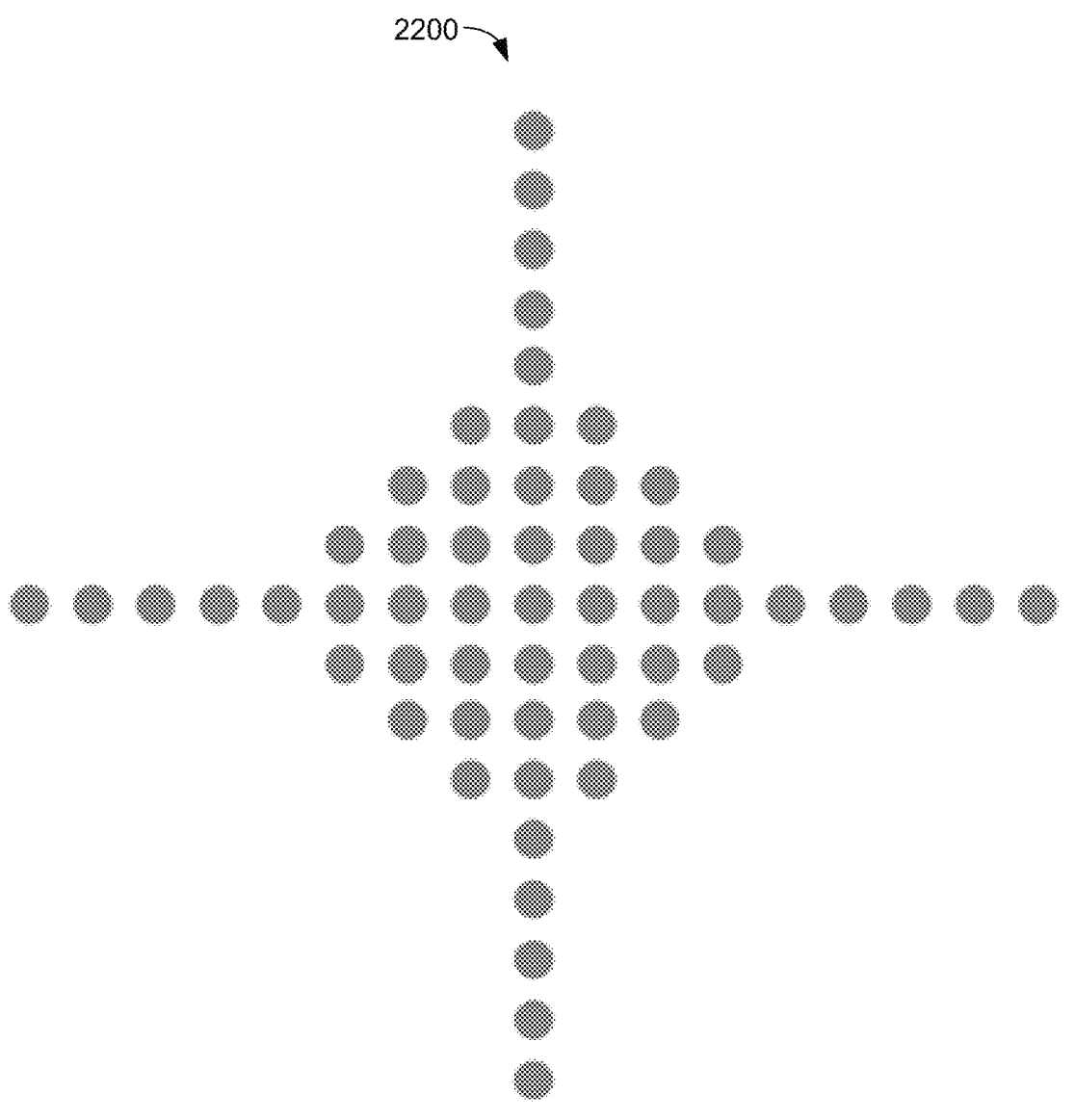
FIG. 22 illustrates a symmetrical shape with a size of 17×17.
Figure 23:
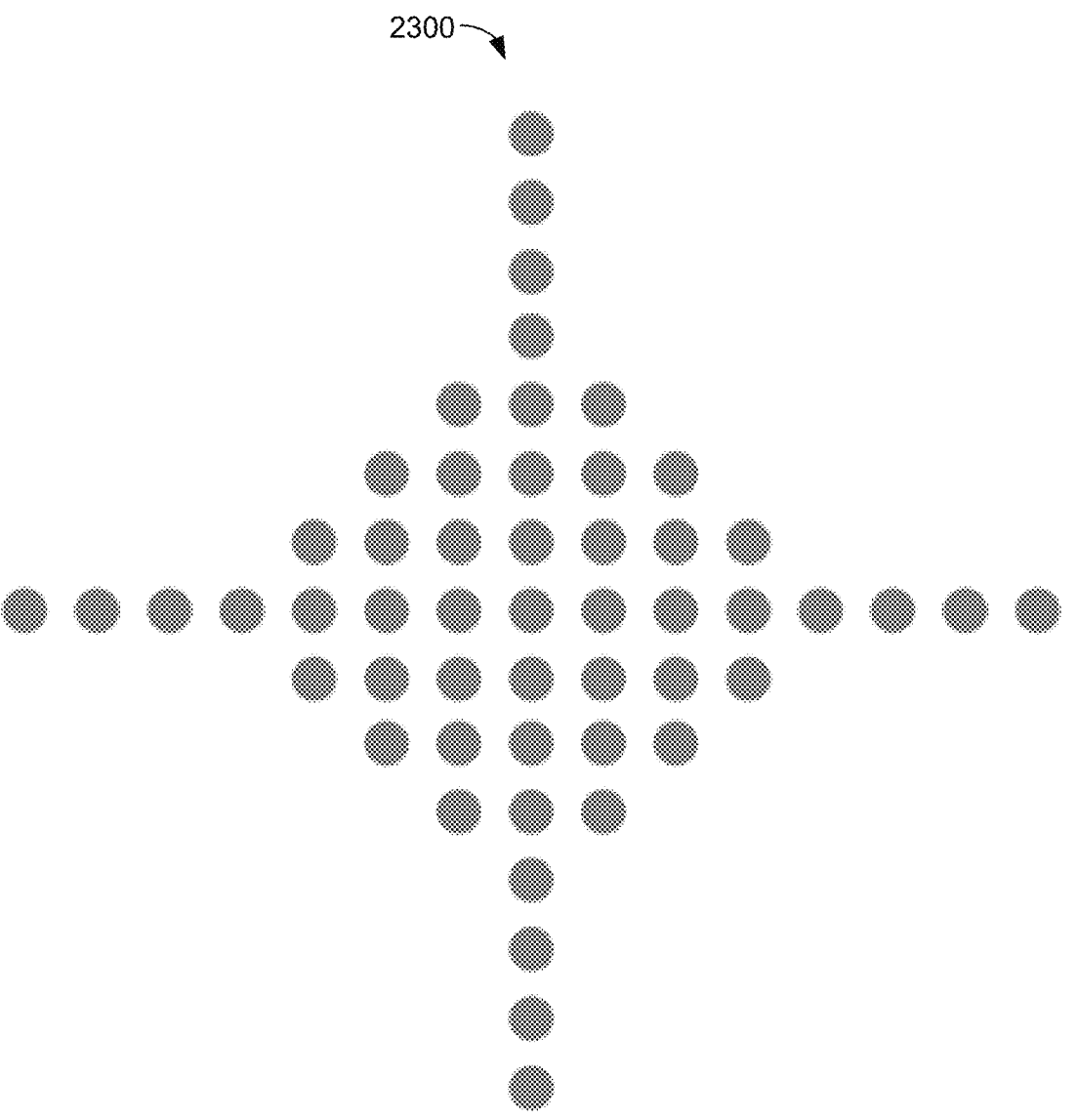
FIG. 23 illustrates a symmetrical shape with a size of 15×15.
Figure 24:
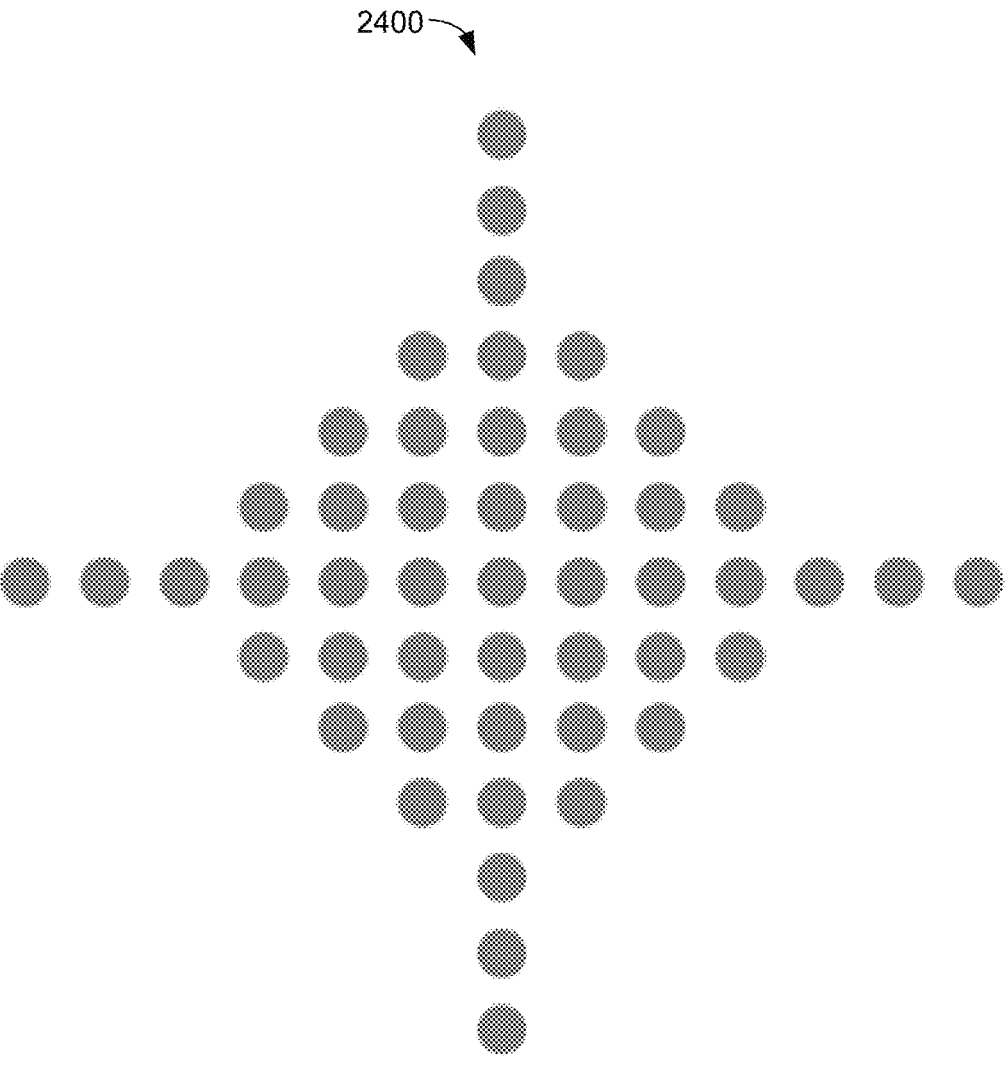
FIG. 24 illustrates a symmetrical shape with a size of 13×13.
Figure 25:
FIG. 25 illustrates a symmetrical shape with a size of 11×11.
Figure 26:
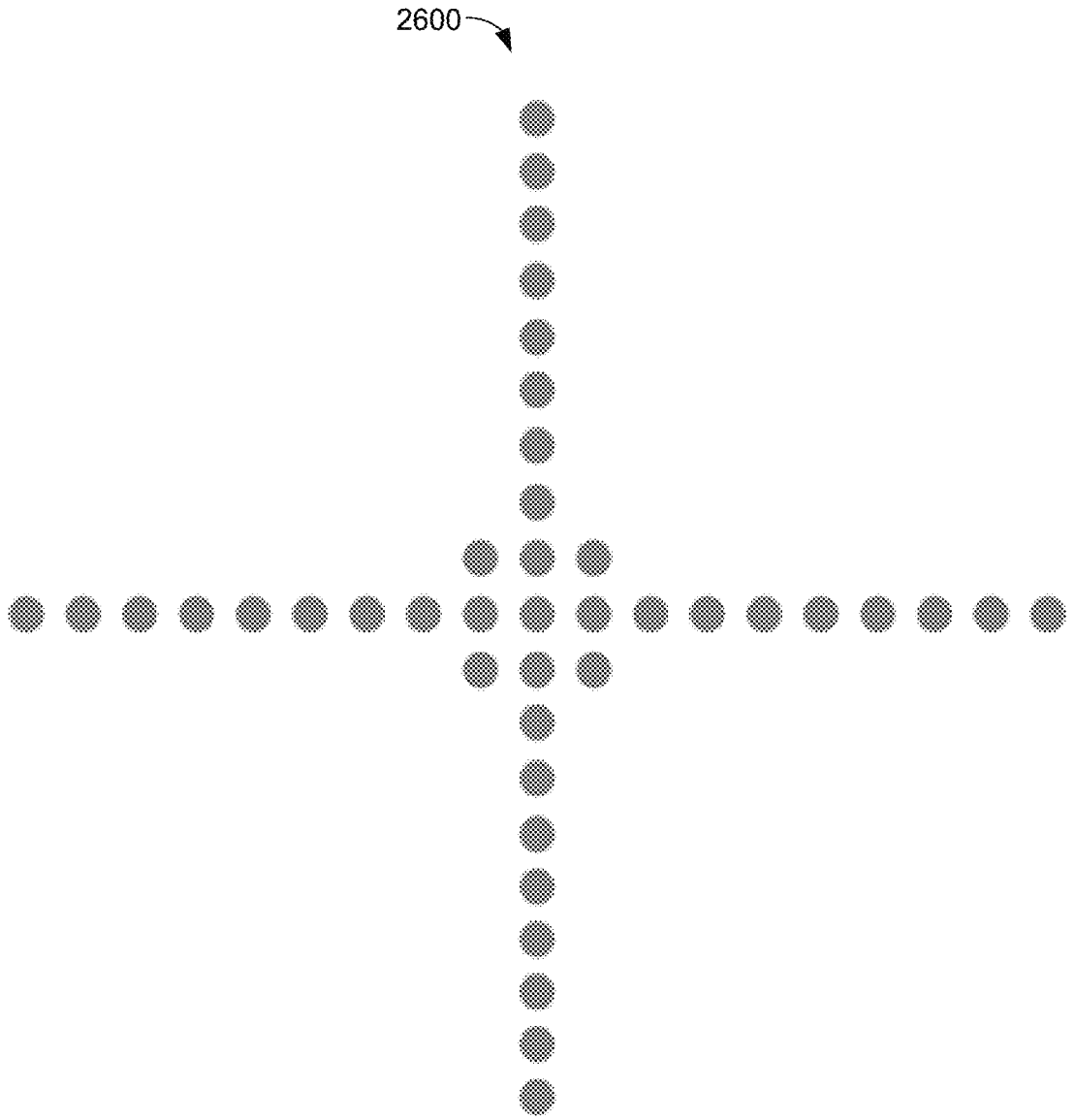
FIG. 26 illustrates a symmetrical shape with a size of 19×19.
Figure 27:
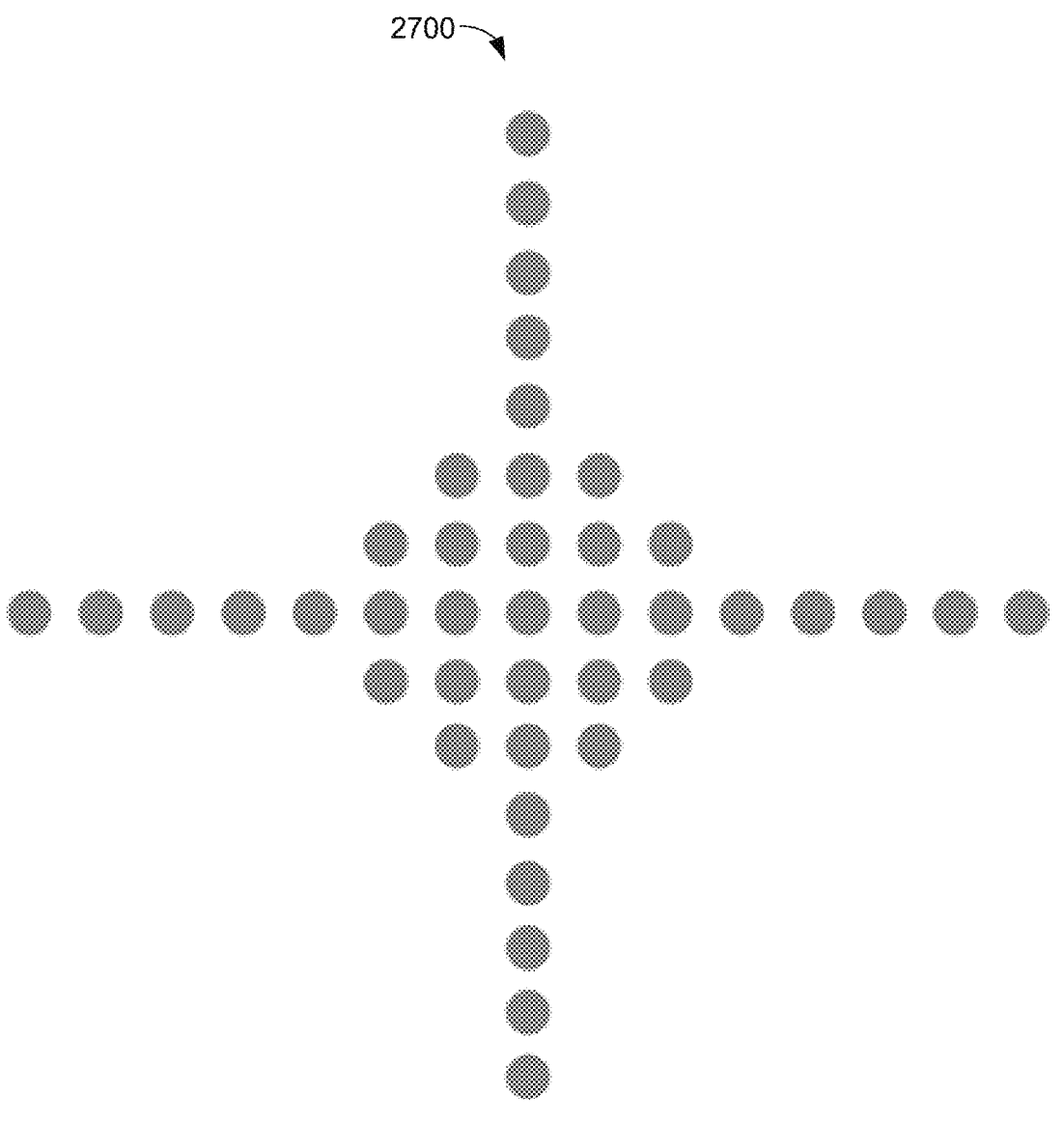
FIG. 27 illustrates a symmetrical shape with a size of 15×15.
Figure 28:
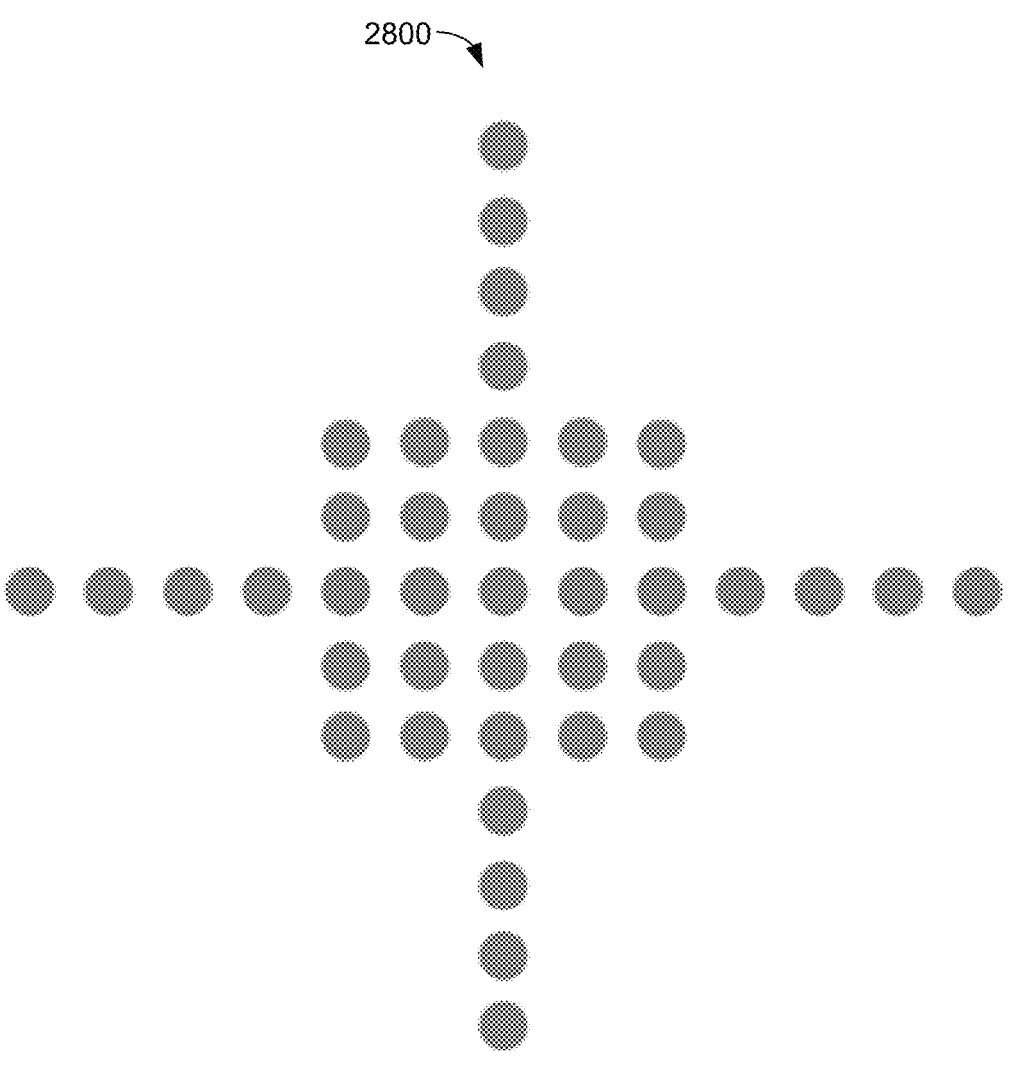
FIG. 28 illustrates a symmetrical shape with a size of 13×13.
Figure 29:
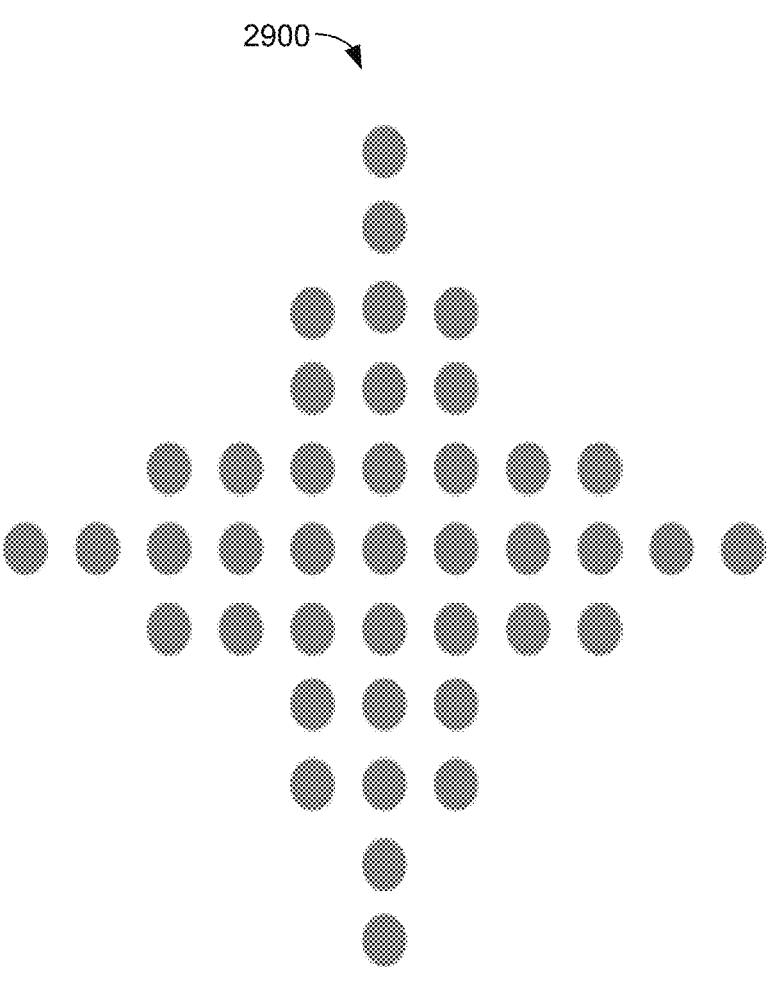
FIG. 29 illustrates a symmetrical shape with a size of 11×11.

8) The multiple filter shapes applied in the proposed filter shape selection method may have different sizes or shapes.

a. In one example, a shape candidate of the proposed filter shape selection may be a diamond.

a) In one example, the size of the shape candidate may be M×N.

b) In one example, a shape candidate may as shown in FIG. 7.

c) In one example, a shape candidate may as shown in FIG. 8.

d) In one example, a shape candidate may as shown in FIG. 9.

e) In one example, a shape candidate may as shown in FIG. 10.

f) In one example, a shape candidate may as shown in FIG. 11.

b. In one example, a shape candidate of the proposed filter shape selection method may be a square.

a) In one example, the size of a shape candidate may be M×N.

b) In one example, a shape candidate may as shown in FIG. 12.

c) In one example, a shape candidate may as shown in FIG. 13.

d) In one example, a shape candidate may as shown in FIG. 14.

e) In one example, a shape candidate may as shown in FIG. 15.

f) In one example, a shape candidate may as shown in FIG. 16.

c. In one example, a shape candidate of the proposed filter shape selection method may be a cross.

a) In one example, the size of a shape candidate may be M×N.

b) In one example, a shape candidate may as shown in FIG. 17.

c) In one example, a shape candidate may as shown in FIG. 18.

d) In one example, a shape candidate may as shown in FIG. 19.

e) In one example, a shape candidate may as shown in FIG. 20.

f) In one example, a shape candidate may as shown in FIG. 21.

d. In one example, a shape candidate of the proposed filter shape selection method may be a symmetrical shape.

a) In one example, the size of a shape candidate may be M×N.

b) In one example, a shape candidate may as shown in FIG. 22.

c) In one example, a shape candidate may as shown in FIG. 23.

d) In one example, a shape candidate may as shown in FIG. 24.

e) In one example, a shape candidate may as shown in FIG. 25.

f) In one example, a shape candidate may as shown in FIG. 26.

g) In one example, a shape candidate may as shown in FIG. 27.

h) In one example, a shape candidate may as shown in FIG. 28.

i) In one example, a shape candidate may as shown in FIG. 29.

e. In one example, a shape candidate of the proposed filter shape selection method may be an asymmetrical shape.

f. In one example, a shape candidate of the proposed filter shape selection method may be other shapes.

g. In one example, the above-mentioned filter shapes may be used for online-trained filters.

h. In one example, the above-mentioned filter shapes may be used for offline-trained filters.

i. Alternatively, the above-mentioned filter shapes may be used for a color component individually.

j. Alternatively, the above-mentioned filter shapes may be used for multiple color components jointly.

9) In above examples, the video unit may refer to sequence/picture/sub-picture/slice/tile/coding tree unit (CTU)/CTU row/groups of CTU/coding unit (CU)/prediction unit (PU)/transform unit (TU)/coding tree block (CTB)/coding block (CB)/prediction block (PB)/transform block (TB)/any other region that contains more than one luma or chroma sample/pixel.

10) Whether to and/or how to apply the disclosed methods above may be signalled in a bitstream.

a. In one example, they may be signalled at sequence level/group of pictures level/picture level/slice level/tile group level, such as in sequence header/picture header/SPS/VPS/DPS/DCI/PPS/APS/slice header/tile group header.

b. In one example, they may be signalled at PB/TB/CB/PU/TU/CU/VPDU/CTU/CTU row/slice/tile/sub-picture/other kinds of region contain more than one sample or pixel.

11) Whether to and/or how to apply the disclosed methods above may be dependent on coded information, such as block size, colour format, single/dual tree partitioning, colour component, slice/picture type.

6. Embodiments

6.1 Embodiment 1

In the following exemplary embodiment, the proposed filter shape selection method may be performed on luma component in ALF. Each APS may contain a filter shape index to indicate which filter shape is used by the luma filter set inside this APS.

In detail, for a slice, the proposed filter shape selection method may let encoder collects the corresponding training data for each filter shape candidate. The class merging and coefficient training process may be performed on each filter shape candidate individually to derive the filter sets that corresponding to each filter shape. During training, each filter set may be trained multiple alternatives/rounds based on the updated CTU on/off decision related to the corresponding filter shape. The coefficients of each alternative/round may be stored. The filter shape of current slice, the CTU on/off decision and the alternative information could be decided by encoder based on the RDO cost.

The following syntax elements are introduced in the APS, wherein additions are underlined, and deleted parts are shown in strike through:

| | Descriptor |
|---|---|
| alf_data( ) { | |
|   alf_luma_filter_signal_flag | u(1) |
|   if( alf_luma_filter_signal_flag ) { | |
|     alf_luma_num_alts_minus1 | ue(v) |
|     alf_luma_shape_idx | u(1) |
|     for(altIdx = 0; altIdx < alf_luma_num_alts_minus1 +1; altIdx++){ | |
|       alf_luma_clip_flag[altIdx] | u(1) |
|       alf_luma_num_filters_signalled_minus1[altIdx] | ue(v) |
|       if(alf_luma_num_filters_signalled_minus1[altIdx] > 0){ | |
|         for( filtIdx = 0; filtIdx < NumAlfFilters; filtIdx++ ) | |
|           alf_luma_coeff_delta_idx[altIdx][filtIdx] | u(v) |
|       } | |
|       for(sfIdx = 0; sfIdx <= alf_luma_num_filters_signalled_minus1[altIdx]; sfIdx++){ | |
|         for(j = 0; j < ~~19~~ numCoeff[alf_luma_shape_idx]; j++){ | |
|           alf_luma_coeff_abs[altIdx][ sfIdx ][ j ] | ue(v) |
|           if( alf_luma_coeff_abs[altIdx][ sfIdx ][ j ] ) | |
|             alf_luma_coeff_sign[altIdx][ sfIdx ][ j ] | u(1) |
|         } | |
|       } | |
|       if( alf_luma_clip_flag [altIdx]) | |
|         for( sfIdx = 0; sfIdx <= alf_luma_num_filters_signalled_minus1[altIdx]; sfIdx++ ) | |
|           for( j = 0; j < ~~19~~ numCoeff[alf_luma_shape_idx]; j++ ) | |
|             alf_luma_clip_idx[altIdx][ sfIdx ][ j ] | u(2) |
|     } | |
|   } | | alf_luma_num_alts_minus1 plus 1 specifies the number of alternative filter sets for luma component. The value of alf_luma_num_alts_minus1 shall be in the range of 0 to 3, inclusive.

alf_luma_shape_idx specifies the filter shape of the luma filters inside one APS. alf_luma_shape_idx equal to 0 specifies that luma filters use a diamond shape; alf_luma_shape_idx equal to 1 specifies that luma filters use a non-diamond shape.

alf_luma_clip_flag[altIdx] equal to 0 specifies that linear adaptive loop filtering is applied to the alternative luma filter set with index altIdx. alf_luma_clip_flag[altIdx] equal to 1 specifies that non-linear adaptive loop filtering could be applied to the alternative luma filter set with index altIdx.

alf_luma_num_filters_signalled_minus1[altIdx] plus 1 specifies the number of adpative loop filter classes for which luma coefficients can be signalled of the alternative luma filter set with index altIdx. The value of alf_luma_num_filters_signalled_minus1 [altIdx] shall be in the range of 0 to NumAlfFilters−1, inclusive.

alf_luma_coeff_delta_idx[altIdx][filtIdx] specifies the indices of the signalled adaptive loop filter luma coefficient deltas for the filter class indicated by filtIdx ranging from 0 to NumAlfFilters−1 for the alternative luma filter set with index altIdx. When alf_luma_coeff_delta_idx[filtIdx][altIdx] is not present, it is inferred to be equal to 0. The length of alf_luma_coeff_delta_idx[altIdx][filtIdx] is Ceil(Log 2(alf_luma_num_filters_signalled_minus1[altIdx]+1)) bits. The value of alf_luma_coeff_delta_idx[altIdx][filtIdx] shall be in the range of 0 to alf_luma_num_filters_signalled_minus1 [altIdx], inclusive.

alf_luma_coeff_abs[altIdx][sfIdx][j] specifies the absolute value of the j-th coefficient of the signalled luma filter indicated by sfIdx of the alternative luma filter set with index altIdx. When alf_luma_coeff_abs[altIdx][sfIdx][j] is not present, it is inferred to be equal 0. The value of alf_luma_coeff_abs[altIdx][sfIdx][j] shall be in the range of 0 to 128, inclusive.

alf_luma_coeff_sign[altIdx][sfIdx][j] specifies the sign of the j-th luma coefficient of the filter indicated by sfIdx of the alternative luma filter set with index altIdx as follows:

If alf_luma_coeff_sign[altIdx][sfIdx][j] is equal to 0, the corresponding luma filter coefficient has a positive value.

Otherwise (alf_luma_coeff_sign[altIdx][sfIdx][j] is equal to 1), the corresponding luma filter coefficient has a negative value.

When alf_luma_coeff_sign[altIdx][sfIdx][j] is not present, it is inferred to be equal to 0.

alf_luma_clip_idx[altIdx][sfIdx][j] specifies the clipping index of the clipping value to use before multiplying by the j-th coefficient of the signalled luma filter indicated by sfIdx of the alternative luma filter set with index altIdx. When alf_luma_clip_idx[altIdx][sfIdx][j] is not present, it is inferred to be equal to 0.

numCoeff[alf_luma_shape_idx] specifies the number of filter coefficients of a luma filter with shape that associated to alt_luma_shape_idx.

For an ALF-enabled luma CTU, the filtering process proceeds as follows.

At the picture border, where samples are unavailable, the ALF uses extension (sample padding) to fill in the unavailable samples. The padding length is based on the max filter length of the filter shape candidates.

The classification for current luma CTU is performed first. Based on the CTU level APS index and CTU level alternative luma filter index, the information for filtering current CTU such as: selected filter shape, number of coefficients of a filter, class merging result, corresponding filter coefficients and clip indices could be reconstructed from the selected APS.

For a sample inside current luma CTU, based on the classification result, the filter coefficients and clip indices could be extracted according to the class merging result. Based on the selected filter shape and generated transpose index, the filter coefficients and clip indices are rearranged for current sample.

Finally, the filtering is performed based on the selected filter shape. The filtered sample value R'(i,j) as shown below, $$R'(i, j) = R(i, j) +$$

$$\left(\left(\sum_{k \neq 0}\sum_{l \neq 0} f(k, l) \times K(R(i + k, j + l) - R(i, j), c(k, l)) + 64\right) >> 7\right)$$

where f(k,l) denotes the decoded filter coefficients, K(x,y) is the clipping function and c(k,l) denotes the decoded clipping parameters. The variable k and l varies between $$-\frac{L}{2} \text{ and } \frac{L}{2}$$

where L denotes the filter length that related to the selected filter shape. The clipping function K(x,y)=min(y,max(−y,x)) which corresponds to the function Clip3 (−y,y,x). The clipping operation introduces non-linearity to make ALF more efficient by reducing the impact of neighbor sample values that are too different with the current sample value.

The embodiments of the present disclosure are related to filter shape selection for adaptive loop filter (ALF) in video coding. As used herein, the term "block" may represent a coding tree block (CTB), a coding tree unit (CTU), a coding block (CB), a coding unit (CU), a prediction unit (PU), a transform unit (TU), a prediction block (PB), a transform block (TB), a video processing unit comprising multiple samples/pixels, and/or the like. A block may be rectangular or non-rectangular. The term "ALF processing unit" may refer to a sequence, a picture, a sub-picture, a slice, a CTU, a block, a region, or a sample. The ALF processing unit may comprise one or more color components.

Figure 30:
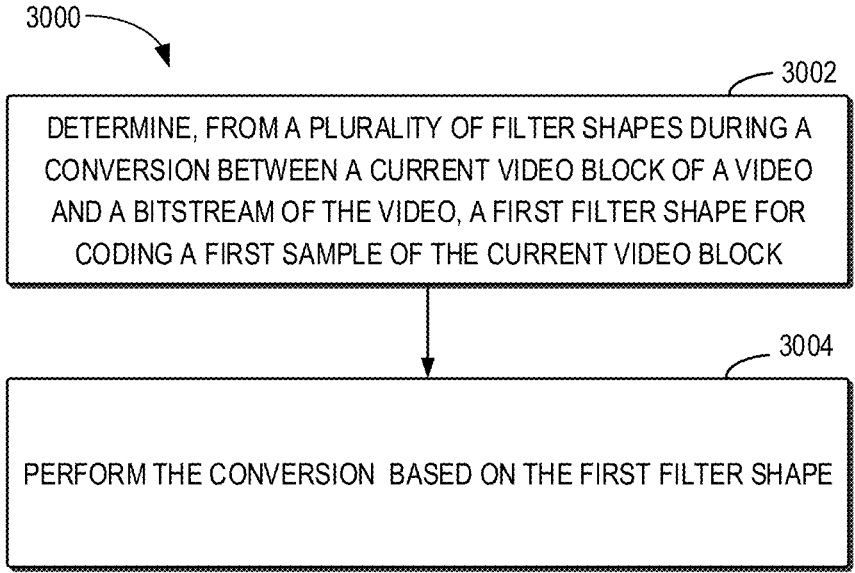
FIG. 30 illustrates a flowchart of a method for video processing in accordance with some embodiments of the present disclosure.

FIG. 30 illustrates a flowchart of a method 3000 for video processing in accordance with some embodiments of the present disclosure. The method 3000 may be implemented during a conversion between a current chroma block of a video and a bitstream of the video. As shown in FIG. 30, the method 3000 starts at 3002 where a first filter shape for coding a first sample of the current video block is determined from a plurality of filter shapes. By way of example, the plurality of filter shapes may comprise five diamond shapes with different sizes, as shown in FIGS. 7-11. For coding the first sample, the diamond shape 700 with a size of 5×5 shown in FIG. 7 may be selected and used.

At 3004, the conversion is performed based on the first filter shape. In the above-mentioned example, a filter with the diamond shape 700 may be used to perform the ALF. In some embodiments, the conversion may include encoding the current chroma block into the bitstream. Alternatively or additionally, the conversion may include decoding the current chroma block from the bitstream. It should be understood that the above examples are described merely for purpose of description. The scope of the present disclosure is not limited in this respect.

According to the method 3000, a sample of a video block is coded with a filter shape selected from a plurality of filter shapes. Compared with the conventional solution where a fixed filter shape is used, the proposed method can advantageously improve the performance of the filtering tool, and thus the coding performance can be improved.

In some embodiments, a second filter shape for coding a second sample of the current video block may be determined from the plurality of filter shapes. The second filter shape may be different from the first filter shape, and the second sample may be different from the first sample. That is, different filter shapes may be applied to two samples within a video unit. At 3004, the conversion is performed based on the first filter shape and the second filter shape.

In some embodiments, the first filter shape may be different from a third filter shape for coding a further video block of the video. That is, different filter shapes may be applied to two video units of the video. In one example, the current video block may be a CTU or a CTB.

In some embodiments, the first sample may be in a first region of the current video block. The first filter shape may be different from a fourth filter shape for coding a third sample in a second region of the current video block. The second region may be different from the first region. That is, different filter shapes may be applied to two regions within a video unit. By way of example, the region may be a slice, a tile, a subpicture, or a picture. It should be understood that the above illustrations are described merely for purpose of description. The scope of the present disclosure is not limited in this respect.

In some embodiments, information on coding the first sample with the first filter shape may be indicated in the bitstream. In some alternative embodiments, the information may be determined based on a filter shape for coding a fifth sample. The fifth sample may be coded before the first sample. That is, which filter shape to be selected from the multiple filter shapes may be inherited. In some further embodiments, the information may be determined on-the-fly.

In some embodiments, the first filter shape may indicate a set of neighboring samples of the first sample to be used in a filtering process of the first sample. Additionally or alternatively, the first filter shape may indicate the number of neighboring samples in a set of neighboring samples of the first sample to be used in a filtering process of the first sample. In one example, the set of neighboring samples may comprise a sample adjacent to the first sample. In another example, the set of neighboring samples may comprise a sample non-adjacent to the first sample.

In some embodiments, the plurality of filter shapes may further comprise a fifth filter shape for coding a further sample of the video. The fifth filter shape may be different from the first filter shape with respect to filter taps. That is, two filter shapes with different filter taps may also be treated as two different filter shapes, even when the filter coefficients for certain locations could be treated to be equal to 0. In one example, the first filter shape may be a diamond shape, and the fifth filter shape may be a diamond shape with a size different from the first filter shape. In another example, the first filter shape may be a diamond shape, and the fifth filter shape may be a square shape with a size same as the first filter shape.

In some embodiments, an indication of the first filter shape may be indicated in the bitstream. For example, the indication may be indicated in an adaptive loop filter adaptation parameter set (ALF APS).

In some embodiments, the first filter shape may be determined based on a fifth filter shape for coding a fifth sample. An indication of the first filter shape may be absent from the bitstream. The fifth sample may be coded before the first sample, and coefficients of a filter with the first filter shape may be determined from an ALF APS associated with the fifth filter shape. That is, when the filter coefficients are inherited from a given ALF APS, the filter shape may also be inherited.

In some embodiments, the video may comprise a first set of samples and a second set of samples. The first set of samples may comprise the first sample. The first filter shape may be different from a sixth filter shape for coding a sixth sample of the second set of samples. That is, different sets of samples may use filters with different filter shapes. In some embodiments, the first set of samples correspond to a first ALF processing unit. In one example, the first ALF processing unit may be a CTU or a CTB. In some alternative embodiments, the first set of samples may comprise: samples in a picture of the video, samples in a slice of the video, samples in a sub-picture of the video, or samples in a sequence of the video. In some further embodiments, the first set of samples may comprise samples in a predetermined band. For example, the first set of samples may comprise samples with values in a predetermined range.

In some embodiments, an index of the first filter shape may be indicated in the bitstream for the first ALF processing unit. In some alternative embodiments, the index of the first filter shape may be derived for the first ALF processing unit. In some further embodiments, the index of the first filter shape may be determined on-the-fly for the first ALF processing unit.

In some embodiments, a flag indicating whether the first sample is to be filtered may be indicated in the bitstream for the filter ALF processing unit. By way of example, the flag may be referred to as on/off control flag. Alternatively, the flag may be derived for the first ALF processing unit. In some further embodiments, the flag may be determined on-the-fly for the first ALF processing unit.

In some embodiments, an index of a training alternative number may be indicated in the bitstream for the filter ALF processing unit. Alternatively, the index may be derived for the first ALF processing unit. In some further embodiments, the index may be determined on-the-fly for the first ALF processing unit.

In some embodiments, a first syntax element indicating the first filter shape may be indicated in the bitstream. In some alternative embodiments, information on whether a first syntax element indicating the first filter shape is indicated in the bitstream may be determined based on a coding condition for coding the video. By way of example, information on whether a first syntax element indicating the first filter shape is indicated in the bitstream may be determined based on the number of filter shapes used for coding the video. It should be understood that the above examples are described merely for purpose of description. The scope of the present disclosure is not limited in this respect.

In some embodiments, the first syntax element may be coded by arithmetic coding. In one example, the first syntax element may be coded with at least one context. In another example, one of the at least one context may be dependent on coding information of the current video block or a neighboring block of the current video block. In a further example, one of the at least one context may be dependent on a filtering shape for coding at least one neighboring block of the current video block. In some alternative embodiments, the first syntax element may be coded with bypass coding.

In some embodiments, the first syntax element may be binarized by one of: a unary code, a truncated unary code, a fixed-length code, an exponential Golomb code, or a truncated exponential Golomb code. In some alternative embodiments, the first syntax element may be coded in a predictive manner. In one example, the first syntax element may be determined based on a filtering shape for coding at least one neighboring block of the current video block.

In some embodiments, the first syntax element may be indicated in the bitstream independently for different color components of the first sample. In some alternative embodiments, the first syntax element may be common to different color components of the first sample, and the first syntax element may be indicated in the bitstream for the different color components. In some further embodiments, the first syntax element may be indicated in the bitstream for a first color second color component of the first sample.

In some embodiments, a shape of the first filter shape may be different from a shape of a fifth filter shape of the plurality of filter shapes. In some additional or alternative embodiments, a size of the first filter shape may be different from a size of the fifth filter.

In some embodiments, the shape of the first filter shape may be a diamond. In one example, the size of the first filter shape may be M×N, where M and N may be predetermined integers. By way of example, the first filter shape may be one of: a diamond shape with a size of 5×5, a diamond shape with a size of 7×7, a diamond shape with a size of 9×9, a diamond shape with a size of 11×11, or a diamond shape with a size of 13×13, as shown in FIGS. 7-11 respectively.

In some embodiments, the shape of the first filter shape may be a square. In one example, the size of the first filter shape may be M×N, where M and N may be predetermined integers. By way of example, the first filter shape may be one of: a square shape with a size of 5×5, a square shape with a size of 7×7, a square shape with a size of 9×9, a square shape with a size of 11×11, or a square shape with a size of 13×13, as shown in FIGS. 12-16 respectively.

In some embodiments, the shape of the first filter shape may be a cross. In one example, the size of the first filter shape may be M×N, where M and N may be predetermined integers. By way of example, the first filter shape may be one of: a cross shape with a size of 5×5, a cross shape with a size of 7×7, a cross shape with a size of 9×9, a cross shape with a size of 11×11, or a cross shape with a size of 13×13, as shown in FIGS. 17-21 respectively.

In some embodiments, the shape of the first filter shape may be a symmetrical shape. In one example, the size of the first filter shape may be M×N, where M and N may be predetermined integers. By way of example, the first filter shape may be one of: a symmetrical shape with a size of 11×11, a symmetrical shape with a size of 13×13, a symmetrical shape with a size of 15×15, a symmetrical shape with a size of 17×17, or a symmetrical shape with a size of 19×19, as shown in FIGS. 22-29.

In some embodiments, the shape of the first filter shape may be an asymmetrical shape. In some alternative embodiments, the shape of the first filter shape may be a shape different from a diamond shape, a square shape and a cross shape.

In some embodiments, the first filter shape may be used for an online-trained filter. In some alternative embodiments, the first filter shape may be used for an offline-trained filter. In some embodiments, the first filter shape may be used for a color component individually. In some alternative embodiments, the first filter shape may be used for a plurality of color components jointly.

In some embodiments, at 3004, a set of coefficients for a first online-trained filter with the first filter shape are determined from a plurality of sets of coefficients. The first online-trained filter may be used for coding the first sample.

Each set of the plurality of sets of coefficients correspond to one or more filter shapes. The conversion is performed based on the set of coefficients.

In some embodiments, the first sample may be a luma sample, and a further online-trained filter for coding a further luma sample of the video has a filter shape different from the first filter shape. In some alternative embodiments, the first sample may be a chroma sample, and a further online-trained filter for coding a further chroma sample of the video has a filter shape different from the first filter shape.

In some embodiments, training data for training online-trained filters may be collected for each of the plurality of filter shapes. In some examples, the collected training data may be used individually for training each of the plurality of filter shapes. In some alternative examples, the collected training data may be used jointly for training each of the plurality of filter shapes.

In some embodiments, a class merging may be performed on the plurality of filter shapes. In some examples, a class merging may be performed individually on each of the plurality of filter shapes. In some alternative examples, a class merging may be performed jointly on each of the plurality of filter shapes. In some further examples, a class merging result for the first filter shape may be reused for a further filter shape of the plurality of filter shapes.

In some embodiments, a training alternative number may be determined for each of the plurality of filter shapes individually. In some alternative examples, a training alternative number may be determined for each of the plurality of filter shapes jointly. In some further examples, a training alternative number for the first filter shape may be reused for a further filter shape of the plurality of filter shapes.

In some embodiments, the first online-trained filter may comprise an additional tap. In one example, an input of the additional tap may be different from a sample located at a predetermined position in a spatial domain. In another example, an input of the additional tap may comprise an intermediate filtering result of a second online-trained filter. In a further example, an input of the additional tap may comprise an intermediate filtering result of an offline-trained filter. In yet another example, an input of the additional tap may comprise an intermediate result generated by a coding tool. In an alternative example, an input of the additional tap may comprise a value determined on-the-fly.

In some embodiments, a filter shape of the offline-trained filter may be the same as an offline-trained filter used for generating an input of an addition tap for a further filter. In some alternative embodiments, a filter shape of the offline-trained filter may be different from an offline-trained filter used for generating an input of an addition tap for a further filter. In some further embodiments, a filter shape of the second online-trained filter may be the same as an online-trained filter used for generating an input of an addition tap for a further filter. In some alternative embodiments, a filter shape of the second online-trained filter may be different from an online-trained filter used for generating an input of an addition tap for a further filter.

In some embodiments, at 3004, a set of coefficients for a first offline-trained filter with the first filter shape are determined from a plurality of sets of coefficients. The first offline-trained filter may be used for coding the first sample. Each set of the plurality of sets of coefficients correspond to one or more filter shapes. The conversion is performed based on the set of coefficients.

In some embodiments, the first sample may be a luma sample, and a further offline-trained filter for coding a further luma sample of the video has a filter shape different from the first filter shape. In some alternative embodiments, the first sample may be a chroma sample, and a further offline-trained filter for coding a further chroma sample of the video has a filter shape different from the first filter shape.

In some embodiments, the plurality of filter shapes may comprise a set of filter shapes for different color components of the video. A syntax element structure may be indicated in the bitstream. The syntax element structure may comprise parameters of a plurality of filters with the set of filter shapes. By way of example, the syntax element structure may be an adaptation parameter set (APS).

In some embodiments, the plurality of filters may comprise a set of filters with an identical filter shape for a luma component of the video. In one example, an index indicating the identical filter shape may be indicated in the syntax element structure. In another example, the number of sets of enabled sets of parameters for the set of filters may be indicated in the syntax element structure. In yet another example, class merging results of the set of filters may be indicated in the syntax element structure. In a further example, coefficients of the set of filters may be indicated in the syntax element structure.

In some embodiments, the plurality of filters may comprise a set of filters with an identical filter shape for a chroma component of the video. In one example, an index indicating the identical filter shape may be indicated in the syntax element structure. In another example, the number of sets of enabled sets of parameters for the set of filters may be indicated in the syntax element structure. In yet another example, class merging results of the set of filters may be indicated in the syntax element structure. In a further example, coefficients of the set of filters may be indicated in the syntax element structure.

In some embodiments, the plurality of filters may comprise a set of filters with different filter shapes for a luma component of the video. In some embodiments, an index indicating one of the different filter shapes may be indicated in the syntax element structure. In one example, the set of filters may comprise a subset of filters with an identical filter shape, and an index indicating the identical filter shape may be indicated in the bitstream.

In some embodiments, the number of sets of enabled sets of parameters for the set of filters may be indicated in the syntax element structure. In one example, the set of filters may comprise a subset of filters with an identical filter shape, and the number of sets of enabled sets of parameters for the subset of filters may be indicated in the syntax element structure.

In some embodiments, class merging results of the set of filters may be indicated in the syntax element structure. In one example, the set of filters may comprise a subset of filters with an identical filter shape, and class merging results of the subset of filters may be indicated in the syntax element structure.

In some embodiments, coefficients of the set of filters may be indicated in the syntax element structure. In one example, the set of filters may comprise a subset of filters with an identical filter shape, and coefficients of the subset of filters may be indicated in the syntax element structure.

In some embodiments, the plurality of filters may comprise a set of filters with different filter shapes for a chroma component of the video. In some embodiments, an index indicating one of the different filter shapes may be indicated in the syntax element structure. In one example, the set of filters may comprise a subset of filters with an identical filter shape, and an index indicating the identical filter shape may be indicated in the bitstream.

In some embodiments, the number of sets of enabled sets of parameters for the set of filters may be indicated in the syntax element structure. In one example, the set of filters may comprise a subset of filters with an identical filter shape, and the number of sets of enabled sets of parameters for the subset of filters may be indicated in the syntax element structure.

In some embodiments, class merging results of the set of filters may be indicated in the syntax element structure. In one example, the set of filters may comprise a subset of filters with an identical filter shape, and class merging results of the subset of filters may be indicated in the syntax element structure.

In some embodiments, coefficients of the set of filters may be indicated in the syntax element structure. In one example, the set of filters may comprise a subset of filters with an identical filter shape, and coefficients of the subset of filters may be indicated in the syntax element structure.

In some embodiments, the plurality of filters may comprise a set of filters with an identical filter shape for a component of the video different from a luma component and a chroma component. In some alternative embodiments, the plurality of filters may comprise a set of filters with different filter shapes for a component of the video different from a luma component and a chroma component.

In some embodiments, the method may be applied to an in-loop filtering tool for video coding. In one example, the method may be applied to one of: an adaptive loop filter (ALF), a cross-component adaptive loop filter (CCALF), or an in-loop filtering tool different from the ALF and CCALF. In some alternative embodiments, the method may be applied to a pre-processing filtering tool for video coding. In some further embodiments, the method may be applied to a post-processing filtering tool for video coding.

In some embodiments, the current video block may be one of: a sequence, a picture, a sub-picture, a slice, a tile, a coding tree unit (CTU) a CTU row groups of CTU a coding unit (CU) a prediction unit (PU), a transform unit (TU), a coding tree block (CTB), a coding block (CB), a prediction block (PB), a transform block (TB), a region that contains a plurality of luma or chroma samples.

In some embodiments, whether to and/or how to apply the method may be indicated in the bitstream. By way of example, whether to and/or how to apply the method may be indicated at one of: sequence level, group of pictures level, picture level, slice level, or tile group level.

In some embodiments, whether to and/or how to apply the method may be indicated in a variety of ways. For example, it may be indicated in a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, and/or a tile group header.

In some embodiments, whether to apply the method according to some embodiments of the present disclosure may be indicated at a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel. Additionally or alternatively, how to apply the method according to some embodiments of the present disclosure may be indicated at one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

In some embodiments, the method according to some embodiments of the present disclosure may further comprise: determining, based on coded information of the current video unit, whether to and/or how to apply the method according to some embodiments of the present disclosure. The coded information may comprise at least one of: a block size, a color format, a single dual tree partitioning, a dual tree partitioning, a color component, a slice type, a picture type, or the like. It should be understood that the above illustrations and/or examples are described merely for purpose of description. The scope of the present disclosure is not limited in this respect.

In some embodiments, a bitstream of a video may be stored in a non-transitory computer-readable recording medium. The bitstream of the video can be generated by a method performed by a video processing apparatus. According to the method, a first filter shape for coding a first sample of the current video block is determined from a plurality of filter shapes. Moreover, the bitstream may be generated based on the first filter shape.

In some embodiments, a first filter shape for coding a first sample of the current video block is determined from a plurality of filter shapes. Moreover, the bitstream may be generated based on the first filter shape. The bitstream may be stored in a non-transitory computer-readable recording medium.

Implementations of the present disclosure can be described in view of the following clauses, the features of which can be combined in any reasonable manner.

Clause 1. A method for video processing, comprising: determining, from a plurality of filter shapes during a conversion between a current video block of a video and a bitstream of the video, a first filter shape for coding a first sample of the current video block; and performing the conversion based on the first filter shape.

Clause 2. The method of clause 1, further comprising: determining, from the plurality of filter shapes, a second filter shape for coding a second sample of the current video block, the second filter shape being different from the first filter shape, the second sample being different from the first sample, wherein performing the conversion comprises: performing the conversion based on the first filter shape and the second filter shape.

Clause 3. The method of any of clauses 1-2, wherein the first filter shape is different from a third filter shape for coding a further video block of the video.

Clause 4. The method of clause 3, wherein the current video block is a coding tree unit (CTU) or a coding tree block (CTB).

Clause 5. The method of any of clauses 1-4, wherein the first sample is in a first region of the current video block, the first filter shape is different from a fourth filter shape for coding a third sample in a second region of the current video block, and the second region is different from the first region.

Clause 6. The method of any of clauses 1-5, wherein information on coding the first sample with the first filter shape is indicated in the bitstream, or the information is determined based on a filter shape for coding a fifth sample, the fifth sample being coded before the first sample, or the information is determined on-the-fly.

Clause 7. The method of any of clauses 1-6, wherein the first filter shape indicates a set of neighboring samples of the first sample to be used in a filtering process of the first sample.

Clause 8. The method of any of clauses 1-6, wherein the first filter shape indicates the number of neighboring samples in a set of neighboring samples of the first sample to be used in a filtering process of the first sample.

Clause 9. The method of any of clauses 7-8, wherein the set of neighboring samples comprise a sample adjacent to the first sample or a sample non-adjacent to the first sample.

Clause 10. The method of any of clauses 1-6, wherein the plurality of filter shapes further comprise a fifth filter shape for coding a further sample of the video, the fifth filter shape is different from the first filter shape with respect to filter taps.

Clause 11. The method of clause 10, wherein the first filter shape is a diamond shape, and the fifth filter shape is a diamond shape with a size different from the first filter shape.

Clause 12. The method of clause 10, wherein the first filter shape is a diamond shape, and the fifth filter shape is a square shape with a size same as the first filter shape.

Clause 13. The method of any of clauses 1-5, wherein an indication of the first filter shape is indicated in the bitstream.

Clause 14. The method of clause 13, wherein the indication is indicated in an adaptive loop filter adaptation parameter set (ALF APS).

Clause 15. The method of any of clauses 1-5, wherein the first filter shape is determined based on a fifth filter shape for coding a fifth sample, an indication of the first filter shape is absent from the bitstream, the fifth sample is coded before the first sample, and coefficients of a filter with the first filter shape are determined from an ALF APS associated with the fifth filter shape.

Clause 16. The method of any of clauses 1-15, wherein the video comprises a first set of samples and a second set of samples, the first set of samples comprise the first sample, the first filter shape is different from a sixth filter shape for coding a sixth sample of the second set of samples.

Clause 17. The method of clause 16, wherein the first set of samples correspond to a first ALF processing unit.

Clause 18. The method of clause 17, wherein the first ALF processing unit is a CTU or a CTB.

Clause 19. The method of clause 16, wherein the first set of samples comprise: samples in a picture of the video, samples in a slice of the video, samples in a sub-picture of the video, or samples in a sequence of the video.

Clause 20. The method of clauses 16, wherein the first set of samples comprise samples in a predetermined band.

Clause 21. The method of clauses 16, wherein the first set of samples comprise samples with values in a predetermined range.

Clause 22. The method of any of clauses 17-18, wherein an index of the first filter shape is indicated in the bitstream for the first ALF processing unit, or the index of the first filter shape is derived for the first ALF processing unit, or the index of the first filter shape is determined on-the-fly for the first ALF processing unit.

Clause 23. The method of any of clauses 17-18, wherein a flag indicating whether the first sample is to be filtered is indicated in the bitstream for the filter ALF processing unit, or the flag is derived for the first ALF processing unit, or the flag is determined on-the-fly for the first ALF processing unit.

Clause 24. The method of any of clauses 17-18, wherein an index of a training alternative number is indicated in the bitstream for the filter ALF processing unit, or the index is derived for the first ALF processing unit, or the index is determined on-the-fly for the first ALF processing unit.

Clause 25. The method of any of clauses 1-15, wherein a first syntax element indicating the first filter shape is indicated in the bitstream.

Clause 26. The method of any of clauses 1-15, wherein information on whether a first syntax element indicating the first filter shape is indicated in the bitstream is determined based on a coding condition for coding the video.

Clause 27. The method of any of clauses 1-15, wherein information on whether a first syntax element indicating the first filter shape is indicated in the bitstream is determined based on the number of filter shapes used for coding the video.

Clause 28. The method of any of clauses 25-27, wherein the first syntax element is coded by arithmetic coding.

Clause 29. The method of clause 28, wherein the first syntax element is coded with at least one context.

Clause 30. The method of clause 29, wherein one of the at least one context is dependent on coding information of the current video block or a neighboring block of the current video block.

Clause 31. The method of clause 29, wherein one of the at least one context is dependent on a filtering shape for coding at least one neighboring block of the current video block.

Clause 32. The method of any of clauses 25-27, wherein the first syntax element is coded with bypass coding.

Clause 33. The method of any of clauses 25-27, wherein the first syntax element is binarized by one of: a unary code, a truncated unary code, a fixed-length code, an exponential Golomb code, or a truncated exponential Golomb code.

Clause 34. The method of any of clauses 25-27, wherein the first syntax element is coded in a predictive manner.

Clause 35. The method of clause 34, wherein the first syntax element is determined based on a filtering shape for coding at least one neighboring block of the current video block.

Clause 36. The method of any of clauses 25-27, wherein the first syntax element is indicated in the bitstream independently for different color components of the first sample.

Clause 37. The method of any of clauses 25-27, wherein the first syntax element is common to different color components of the first sample, and the first syntax element is indicated in the bitstream for the different color components.

Clause 38. The method of any of clauses 25-27, wherein the first syntax element is indicated in the bitstream for a first color second color component of the first sample.

Clause 39. The method of any of clauses 1-38, wherein a shape of the first filter shape is different from a shape of a fifth filter shape of the plurality of filter shapes, or a size of the first filter shape is different from a size of the fifth filter.

Clause 40. The method of clause 39, wherein the shape of the first filter shape is a diamond.

Clause 41. The method of clause 40, wherein the size of the first filter shape is M×N, where M and N are predetermined integers.

Clause 42. The method of clause 39, wherein the first filter shape is one of: a diamond shape with a size of 5×5, a diamond shape with a size of 7×7, a diamond shape with a size of 9×9, a diamond shape with a size of 11×11, or a diamond shape with a size of 13×13.

Clause 43. The method of clause 39, wherein the shape of the first filter shape is a square.

Clause 44. The method of clause 43, wherein the size of the first filter shape is M×N, where M and N are predetermined integers.

Clause 45. The method of clause 39, wherein the first filter shape is one of: a square shape with a size of 5×5, a square shape with a size of 7×7, a square shape with a size of 9×9, a square shape with a size of 11×11, or a square shape with a size of 13×13.

Clause 46. The method of clause 39, wherein the shape of the first filter shape is a cross.

Clause 47. The method of clause 46, wherein the size of the first filter shape is M×N, where M and N are predetermined integers.

Clause 48. The method of clause 39, wherein the first filter shape is one of: a cross shape with a size of 5×5, a cross shape with a size of 7×7, a cross shape with a size of 9×9, a cross shape with a size of 11×11, or a cross shape with a size of 13×13.

Clause 49. The method of clause 39, wherein the shape of the first filter shape is a symmetrical shape.

Clause 50. The method of clause 49, wherein the size of the first filter shape is M×N, where M and N are predetermined integers.

Clause 51. The method of clause 39, wherein the first filter shape is one of: a symmetrical shape with a size of 11×11, a symmetrical shape with a size of 13×13, a symmetrical shape with a size of 15×15, a symmetrical shape with a size of 17×17, or a symmetrical shape with a size of 19×19.

Clause 52. The method of clause 39, wherein the shape of the first filter shape is an asymmetrical shape.

Clause 53. The method of clause 39, wherein the shape of the first filter shape is a shape different from a diamond shape, a square shape and a cross shape.

Clause 54. The method of any of clauses 40-53, wherein the first filter shape is used for an online-trained filter.

Clause 55. The method of any of clauses 40-53, wherein the first filter shape is used for an offline-trained filter.

Clause 56. The method of any of clauses 40-53, wherein the first filter shape is used for a color component individually.

Clause 57. The method of any of clauses 40-53, wherein the first filter shape is used for a plurality of color components jointly.

Clause 58. The method of any of clauses 1-15, wherein performing the conversion comprises: determining, from a plurality of sets of coefficients, a set of coefficients for a first online-trained filter with the first filter shape, the first online-trained filter being used for coding the first sample, each set of the plurality of sets of coefficients corresponding to one or more filter shapes; and performing the conversion based on the set of coefficients.

Clause 59. The method of clause 58, wherein the first sample is a luma sample, and a further online-trained filter for coding a further luma sample of the video has a filter shape different from the first filter shape.

Clause 60. The method of clause 58, wherein the first sample is a chroma sample, and a further online-trained filter for coding a further chroma sample of the video has a filter shape different from the first filter shape.

Clause 61. The method of any of clauses 58-60, wherein training data for training online-trained filters is collected for each of the plurality of filter shapes.

Clause 62. The method of clause 61, wherein the collected training data is used individually for training each of the plurality of filter shapes.

Clause 63. The method of clause 61, wherein the collected training data is used jointly for training each of the plurality of filter shapes.

Clause 64. The method of any of clauses 58-60, wherein a class merging is performed on the plurality of filter shapes.

Clause 65. The method of any of clauses 58-60, wherein a class merging is performed individually on each of the plurality of filter shapes.

Clause 66. The method of any of clauses 58-60, wherein a class merging is performed jointly on each of the plurality of filter shapes.

Clause 67. The method of clause 64, wherein a class merging result for the first filter shape is reused for a further filter shape of the plurality of filter shapes.

Clause 68. The method of any of clauses 58-60, wherein a training alternative number is determined for each of the plurality of filter shapes individually, or a training alternative number is determined for each of the plurality of filter shapes jointly.

Clause 69. The method of any of clauses 58-60, wherein a training alternative number for the first filter shape is reused for a further filter shape of the plurality of filter shapes.

Clause 70. The method of any of clauses 58-60, wherein the first online-trained filter comprises an additional tap.

Clause 71. The method of clause 70, wherein an input of the additional tap is different from a sample located at a predetermined position in a spatial domain.

Clause 72. The method of clause 70, wherein an input of the additional tap comprises an intermediate filtering result of a second online-trained filter.

Clause 73. The method of clause 70, wherein an input of the additional tap comprises an intermediate filtering result of an offline-trained filter.

Clause 74. The method of clause 70, wherein an input of the additional tap comprises an intermediate result generated by a coding tool.

Clause 75. The method of clause 70, wherein an input of the additional tap comprises a value determined on-the-fly.

Clause 76. The method of clause 73, wherein a filter shape of the offline-trained filter is the same as an offline-trained filter used for generating an input of an addition tap for a further filter.

Clause 77. The method of clause 73, wherein a filter shape of the offline-trained filter is different from an offline-trained filter used for generating an input of an addition tap for a further filter.

Clause 78. The method of clause 72, wherein a filter shape of the second online-trained filter is the same as an online-trained filter used for generating an input of an addition tap for a further filter.

Clause 79. The method of clause 72, wherein a filter shape of the second online-trained filter is different from an online-trained filter used for generating an input of an addition tap for a further filter.

Clause 80. The method of any of clauses 1-15, wherein performing the conversion comprises: determining, from a plurality of sets of coefficients, a set of coefficients for a first offline-trained filter with the first filter shape, the first offline-trained filter being used for coding the first sample, each set of the plurality of sets of coefficients corresponding to one or more filter shapes; and performing the conversion based on the set of coefficients.

Clause 81. The method of clause 80, wherein the first sample is a luma sample, and a further offline-trained filter for coding a further luma sample of the video has a filter shape different from the first filter shape.

Clause 82. The method of clause 80, wherein the first sample is a chroma sample, and a further offline-trained filter for coding a further chroma sample of the video has a filter shape different from the first filter shape.

Clause 83. The method of any of clauses 1-15, wherein the plurality of filter shapes comprise a set of filter shapes for different color components of the video, a syntax element structure is indicated in the bitstream, the syntax element structure comprises parameters of a plurality of filters with the set of filter shapes.

Clause 84. The method of clause 83, wherein the syntax element structure is an adaptation parameter set (APS).

Clause 85. The method of any of clauses 83-84, wherein the plurality of filters comprise a set of filters with an identical filter shape for a luma component of the video.

Clause 86. The method of clause 85, wherein an index indicating the identical filter shape is indicated in the syntax element structure.

Clause 87. The method of clause 85, wherein the number of sets of enabled sets of parameters for the set of filters is indicated in the syntax element structure.

Clause 88. The method of clause 85, wherein class merging results of the set of filters are indicated in the syntax element structure.

Clause 89. The method of clause 85, wherein coefficients of the set of filters are indicated in the syntax element structure.

Clause 90. The method of any of clauses 83-84, wherein the plurality of filters comprise a set of filters with an identical filter shape for a chroma component of the video.

Clause 91. The method of clause 90, wherein an index indicating the identical filter shape is indicated in the syntax element structure.

Clause 92. The method of clause 90, wherein the number of sets of enabled sets of parameters for the set of filters is indicated in the syntax element structure.

Clause 93. The method of clause 90, wherein class merging results of the set of filters are indicated in the syntax element structure.

Clause 94. The method of clause 90, wherein coefficients of the set of filters are indicated in the syntax element structure.

Clause 95. The method of any of clauses 83-84, wherein the plurality of filters comprise a set of filters with different filter shapes for a luma component of the video.

Clause 96. The method of clause 95, wherein an index indicating one of the different filter shapes is indicated in the syntax element structure.

Clause 97. The method of clause 96, wherein the set of filters comprises a subset of filters with an identical filter shape, and an index indicating the identical filter shape is indicated in the bitstream.

Clause 98. The method of clause 95, wherein the number of sets of enabled sets of parameters for the set of filters is indicated in the syntax element structure.

Clause 99. The method of clause 98, wherein the set of filters comprises a subset of filters with an identical filter shape, and the number of sets of enabled sets of parameters for the subset of filters is indicated in the syntax element structure.

Clause 100. The method of clause 95, wherein class merging results of the set of filters are indicated in the syntax element structure.

Clause 101. The method of clause 100, wherein the set of filters comprises a subset of filters with an identical filter shape, and class merging results of the subset of filters are indicated in the syntax element structure.

Clause 102. The method of clause 95, wherein coefficients of the set of filters are indicated in the syntax element structure.

Clause 103. The method of clause 102, wherein the set of filters comprises a subset of filters with an identical filter shape, and coefficients of the subset of filters are indicated in the syntax element structure.

Clause 104. The method of any of clauses 83-84, wherein the plurality of filters comprise a set of filters with different filter shapes for a chroma component of the video.

Clause 105. The method of clause 104, wherein an index indicating one of the different filter shapes is indicated in the syntax element structure.

Clause 106. The method of clause 105, wherein the set of filters comprises a subset of filters with an identical filter shape, and an index indicating the identical filter shape is indicated in the bitstream.

Clause 107. The method of clause 104, wherein the number of sets of enabled sets of parameters for the set of filters is indicated in the syntax element structure.

Clause 108. The method of clause 107, wherein the set of filters comprises a subset of filters with an identical filter shape, and the number of sets of enabled sets of parameters for the subset of filters is indicated in the syntax element structure.

Clause 109. The method of clause 104, wherein class merging results of the set of filters are indicated in the syntax element structure.

Clause 110. The method of clause 109, wherein the set of filters comprises a subset of filters with an identical filter shape, and class merging results of the subset of filters are indicated in the syntax element structure.

Clause 111. The method of clause 104, wherein coefficients of the set of filters are indicated in the syntax element structure.

Clause 112. The method of clause 111, wherein the set of filters comprises a subset of filters with an identical filter shape, and coefficients of the subset of filters are indicated in the syntax element structure.

Clause 113. The method of any of clauses 83-84, wherein the plurality of filters comprise a set of filters with an identical filter shape for a component of the video different from a luma component and a chroma component.

Clause 114. The method of any of clauses 83-84, wherein the plurality of filters comprise a set of filters with different filter shapes for a component of the video different from a luma component and a chroma component.

Clause 115. The method of any of clauses 1-114, wherein the method is applied to an in-loop filtering tool for video coding.

Clause 116. The method of any of clauses 1-114, wherein the method is applied to one of: an adaptive loop filter (ALF), a cross-component adaptive loop filter (CCALF), or an in-loop filtering tool different from the ALF and CCALF.

Clause 117. The method of any of clauses 1-114, wherein the method is applied to a pre-processing filtering tool for video coding.

Clause 118. The method of any of clauses 1-114, wherein the method is applied to a post-processing filtering tool for video coding.

Clause 119. The method of any of clauses 1-118, wherein the current video block is one of: a sequence, a picture, a sub-picture, a slice, a tile, a coding tree unit (CTU) a CTU row groups of CTU a coding unit (CU) a prediction unit (PU), a transform unit (TU), a coding tree block (CTB), a coding block (CB), a prediction block (PB), a transform block (TB), a region that contains a plurality of luma or chroma samples.

Clause 120. The method of any of clauses 1-118, wherein whether to and/or how to apply the method is indicated in the bitstream.

Clause 121. The method of any of clauses 1-118, wherein whether to and/or how to apply the method is indicated at one of: sequence level, group of pictures level, picture level, slice level, or tile group level.

Clause 122. The method of any of clauses 1-118, wherein whether to and/or how to apply the method is indicated in one of: a sequence header, a picture header, a sequence parameter set (SPS), a video parameter set (VPS), a dependency parameter set (DPS), a decoding capability information (DCI), a picture parameter set (PPS), an adaptation parameter sets (APS), a slice header, or a tile group header.

Clause 123. The method of any of clauses 1-118, wherein whether to and/or how to apply the method is indicated at one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a sub-picture, or a region containing more than one sample or pixel.

Clause 124. The method of any of clauses 1-118, further comprising: determining, based on coded information of the current video unit, whether to and/or how to apply the method, the coded information comprising at least one of: a block size, a colour format, a single dual tree partitioning, a dual tree partitioning, a colour component, a slice type, or a picture type.

Clause 125. The method of any of clauses 1-124, wherein the conversion includes encoding the current video block into the bitstream.

Clause 126. The method of any of clauses 1-124, wherein the conversion includes decoding the current video block from the bitstream.

Clause 127. An apparatus for processing video data comprising a processor and a non-transitory memory with instructions thereon, wherein the instructions upon execution by the processor, cause the processor to perform a method in accordance with any of Clauses 1-126.

Clause 128. A non-transitory computer-readable storage medium storing instructions that cause a processor to perform a method in accordance with any of Clauses 1-126.

Clause 129. A non-transitory computer-readable recording medium storing a bitstream of a video which is generated by a method performed by a video processing apparatus, wherein the method comprises: determining, from a plurality of filter shapes, a first filter shape for coding a first sample of a current video block of the video; and generating the bitstream based on the first filter shape.

Clause 130. A method for storing a bitstream of a video, comprising: determining, from a plurality of filter shapes, a first filter shape for coding a first sample of a current video block of the video; generating the bitstream based on the first filter shape; and storing the bitstream in a non-transitory computer-readable recording medium.

Example Device

Figure 31:
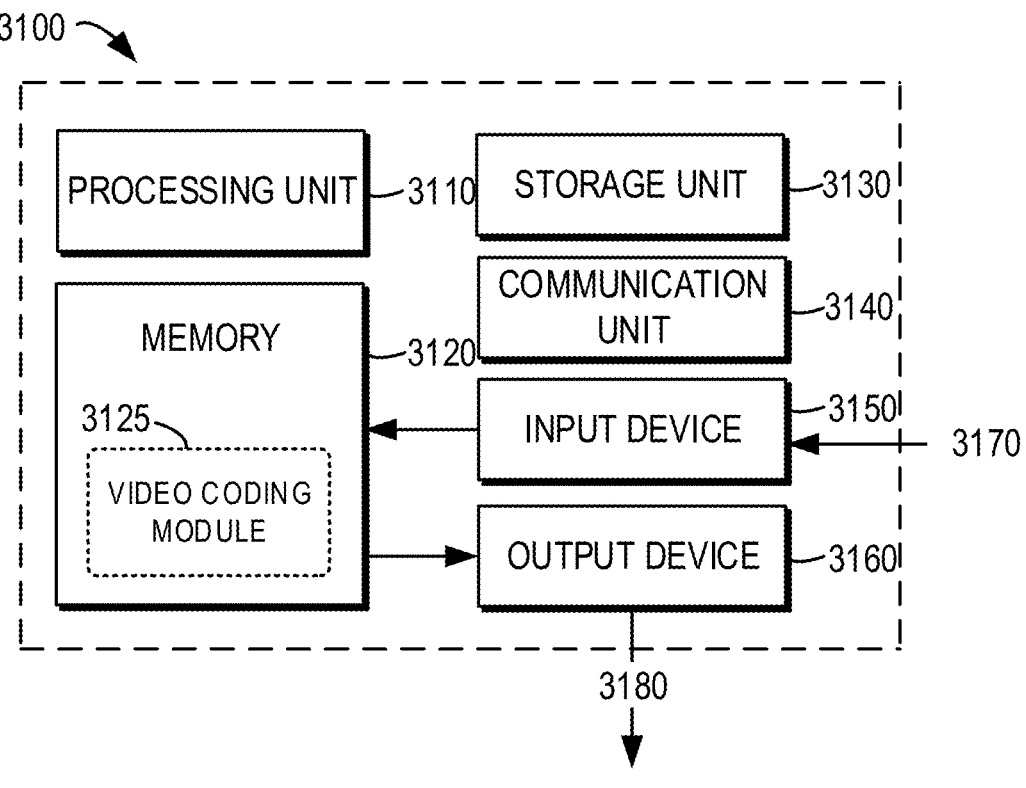
FIG. 31 illustrates a block diagram of a computing device in which various embodiments of the present disclosure can be implemented.

FIG. 31 illustrates a block diagram of a computing device 3100 in which various embodiments of the present disclosure can be implemented. The computing device 3100 may be implemented as or included in the source device 110 (or the video encoder 114 or 200) or the destination device 120 (or the video decoder 124 or 300).

It would be appreciated that the computing device 3100 shown in FIG. 31 is merely for purpose of illustration, without suggesting any limitation to the functions and scopes of the embodiments of the present disclosure in any manner.

As shown in FIG. 31, the computing device 3100 includes a general-purpose computing device 3100. The computing device 3100 may at least comprise one or more processors or processing units 3110, a memory 3120, a storage unit 3130, one or more communication units 3140, one or more input devices 3150, and one or more output devices 3160.

In some embodiments, the computing device 3100 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 3100 can support any type of interface to a user (such as "wearable" circuitry and the like).

The processing unit 3110 may be a physical or virtual processor and can implement various processes based on programs stored in the memory 3120. In a multi-processor system, multiple processing units execute computer executable instructions in parallel so as to improve the parallel processing capability of the computing device 3100. The processing unit 3110 may also be referred to as a central processing unit (CPU), a microprocessor, a controller or a microcontroller.

The computing device 3100 typically includes various computer storage medium. Such medium can be any medium accessible by the computing device 3100, including, but not limited to, volatile and non-volatile medium, or detachable and non-detachable medium. The memory 3120 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 3130 may be any detachable or non-detachable medium and may include a machine-readable medium such as a memory, flash memory drive, magnetic disk or another other media, which can be used for storing information and/or data and can be accessed in the computing device 3100.

The computing device 3100 may further include additional detachable/non-detachable, volatile/non-volatile memory medium. Although not shown in FIG. 31, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 3140 communicates with a further computing device via the communication medium. In addition, the functions of the components in the computing device 3100 can be implemented by a single computing cluster or multiple computing machines that can communicate via communication connections. Therefore, the computing device 3100 can operate in a networked environment using a logical connection with one or more other servers, networked personal computers (PCs) or further general network nodes.

The input device 3150 may be one or more of a variety of input devices, such as a mouse, keyboard, tracking ball, voice-input device, and the like. The output device 3160 may be one or more of a variety of output devices, such as a display, loudspeaker, printer, and the like. By means of the communication unit 3140, the computing device 3100 can further communicate with one or more external devices (not shown) such as the storage devices and display device, with one or more devices enabling the user to interact with the computing device 3100, or any devices (such as a network card, a modem and the like) enabling the computing device 3100 to communicate with one or more other computing devices, if required. Such communication can be performed via input/output (I/O) interfaces (not shown).

In some embodiments, instead of being integrated in a single device, some or all components of the computing device 3100 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 3100 may be used to implement video encoding/decoding in embodiments of the present disclosure. The memory 3120 may include one or more video coding modules 3125 having one or more program instructions. These modules are accessible and executable by the processing unit 3110 to perform the functionalities of the various embodiments described herein.

In the example embodiments of performing video encoding, the input device 3150 may receive video data as an input 3170 to be encoded. The video data may be processed, for example, by the video coding module 3125, to generate an encoded bitstream. The encoded bitstream may be provided via the output device 3160 as an output 3180.

In the example embodiments of performing video decoding, the input device 3150 may receive an encoded bitstream as the input 3170. The encoded bitstream may be processed, for example, by the video coding module 3125, to generate decoded video data. The decoded video data may be provided via the output device 3160 as the output 3180.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, from a plurality of filter shapes during a conversion between a current video block of a video and a bitstream of the video, a first filter shape for coding a first sample of the current video block; and performing the conversion based on the first filter shape, wherein performing the conversion comprises:

determining, from a plurality of sets of coefficients, a set of coefficients for a first offline-trained filter with the first filter shape, the first offline-trained filter being used for coding the first sample, each set of the plurality of sets of coefficients corresponding to one or more filter shapes; and performing the conversion based on the set of coefficients, and wherein the first sample is a luma sample, and a further offline-trained filter for coding a further luma sample of the video has a filter shape different from the first filter shape, or wherein the first sample is a chroma sample, and a further offline-trained filter for coding a further chroma sample of the video has a filter shape different from the first filter shape.

2. The method of claim 1, wherein the first set of samples correspond to a first ALF processing unit.

3. The method of any of claim 2, wherein an index of the first filter shape is indicated in the bitstream for the first ALF processing unit, or the index of the first filter shape is derived for the first ALF processing unit, or the index of the first filter shape is determined on-the-fly for the first ALF processing unit, of a flag indicating whether the first sample is to be filtered is indicated in the bitstream for the filter ALF processing unit, or the flag is derived for the first ALF processing unit, or the flag is determined on-the-fly for the first ALF processing unit.

4. The method of claim 1, wherein a shape of the first filter shape is different from a shape of a fifth filter shape of the plurality of filter shapes, or a size of the first filter shape is different from a size of the fifth filter.

5. The method of claim 4, wherein the shape of the first filter shape is one of the following: a diamond, a square, a cross, or a symmetrical shape, or wherein the shape of the first filter shape is an asymmetrical shape.

6. The method of claim 4, wherein the first filter shape is one of:

a diamond shape with a size of 5×5, a diamond shape with a size of 7×7, a diamond shape with a size of 9×9, a diamond shape with a size of 11×11, a diamond shape with a size of 13×13, a square shape with a size of 5×5, a square shape with a size of 7×7, a square shape with a size of 9×9, a square shape with a size of 11×11, or a square shape with a size of 13×13, a cross shape with a size of 5×5, a cross shape with a size of 7×7, a cross shape with a size of 9×9, a cross shape with a size of 11×11, a cross shape with a size of 13×13, a symmetrical shape with a size of 11×11, a symmetrical shape with a size of 13×13, a symmetrical shape with a size of 15×15, a symmetrical shape with a size of 17×17, or a symmetrical shape with a size of 19×19.

7. The method of claim 1, wherein the first filter shape is used for an online-trained filter, or the first filter shape is used for an offline-trained filter.

8. The method of claim 1, wherein performing the conversion comprises:

determining, from a plurality of sets of coefficients, a set of coefficients for a first online-trained filter with the first filter shape, the first online-trained filter being used for coding the first sample, each set of the plurality of sets of coefficients corresponding to one or more filter shapes; and performing the conversion based on the set of coefficients.

9. The method of claim 8, wherein the first sample is a luma sample, and a further online-trained filter for coding a further luma sample of the video has a filter shape different from the first filter shape, or wherein the first sample is a chroma sample, and a further online-trained filter for coding a further chroma sample of the video has a filter shape different from the first filter shape, or wherein a class merging is performed individually on each of the plurality of filter shapes, or wherein a training alternative number is determined for each of the plurality of filter shapes individually, or a training alternative number is determined for each of the plurality of filter shapes jointly, or wherein the first online-trained filter comprises an additional tap, an input of the additional tap comprises an intermediate filtering result of an offline-trained filter, and wherein a filter shape of the offline-trained filter is the same as an offline-trained filter used for generating an input of an addition tap for a further filter, or a filter shape of the offline-trained filter is different from an offline-trained filter used for generating an input of an addition tap for a further filter.

10. The method of claim 1, wherein the plurality of filter shapes comprise a set of filter shapes for different color components of the video, a syntax element structure is indicated in the bitstream, the syntax element structure comprises parameters of a plurality of filters with the set of filter shapes.

11. The method of claim 10, wherein the plurality of filters comprise a set of filters with an identical filter shape for a luma component of the video, and wherein an index indicating the identical filter shape is indicated in the syntax element structure, or the number of sets of enabled sets of parameters for the set of filters is indicated in the syntax element structure, or class merging results of the set of filters are indicated in the syntax element structure, or wherein coefficients of the set of filters are indicated in the syntax element structure.

12. The method of claim 10, wherein the plurality of filters comprise a set of filters with an identical filter shape for a chroma component of the video, and wherein an index indicating the identical filter shape is indicated in the syntax element structure, or the number of sets of enabled sets of parameters for the set of filters is indicated in the syntax element structure, or class merging results of the set of filters are indicated in the syntax element structure, or wherein coefficients of the set of filters are indicated in the syntax element structure.

13. The method of claim 10, wherein the plurality of filters comprise a set of filters with different filter shapes for a luma component of the video, and wherein an index indicating one of the different filter shapes is indicated in the syntax element structure, or the number of sets of enabled sets of parameters for the set of filters is indicated in the syntax element structure, or class merging results of the set of filters are indicated in the syntax element structure, or wherein coefficients of the set of filters are indicated in the syntax element structure.

14. The method of claim 10, wherein the plurality of filters comprise a set of filters with different filter shapes for a chroma component of the video, and wherein an index indicating one of the different filter shapes is indicated in the syntax element structure, or the number of sets of enabled sets of parameters for the set of filters is indicated in the syntax element structure, or class merging results of the set of filters are indicated in the syntax element structure, or coefficients of the set of filters are indicated in the syntax element structure.

15. The method of claim 1, wherein the method is applied to one of:

an adaptive loop filter (ALF), a cross-component adaptive loop filter (CCALF), or an in-loop filtering tool different from the ALF and CCALF.

16. The method of claim 1, wherein the conversion includes encoding the current video block into the bitstream, or wherein the conversion includes decoding the current video block from the bitstream.

17. An apparatus for processing video data comprising a processor and a non-transitory memory with instructions thereon, wherein the instructions upon execution by the processor, cause the processor to perform acts comprising:

determining, from a plurality of filter shapes during a conversion between a current video block of a video and a bitstream of the video, a first filter shape for coding a first sample of the current video block; and performing the conversion based on the first filter shape, wherein performing the conversion comprises:

determining, from a plurality of sets of coefficients, a set of coefficients for a first offline-trained filter with the first filter shape, the first offline-trained filter being used for coding the first sample, each set of the plurality of sets of coefficients corresponding to one or more filter shapes; and performing the conversion based on the set of coefficients, and wherein the first sample is a luma sample, and a further offline-trained filter for coding a further luma sample of the video has a filter shape different from the first filter shape, or wherein the first sample is a chroma sample, and a further offline-trained filter for coding a further chroma sample of the video has a filter shape different from the first filter shape.

18. A non-transitory computer-readable storage medium storing instructions that cause a processor to perform acts comprising:

determining, from a plurality of filter shapes during a conversion between a current video block of a video and a bitstream of the video, a first filter shape for coding a first sample of the current video block; and performing the conversion based on the first filter shape, wherein performing the conversion comprises:

determining, from a plurality of sets of coefficients, a set of coefficients for a first offline-trained filter with the first filter shape, the first offline-trained filter being used for coding the first sample, each set of the plurality of sets of coefficients corresponding to one or more filter shapes; and performing the conversion based on the set of coefficients, and wherein the first sample is a luma sample, and a further offline-trained filter for coding a further luma sample of the video has a filter shape different from the first filter shape, or wherein the first sample is a chroma sample, and a further offline-trained filter for coding a further chroma sample of the video has a filter shape different from the first filter shape.

19. A non-transitory computer-readable recording medium storing a bitstream of a video which is generated by a method performed by a video processing apparatus, wherein the method comprises:

determining, from a plurality of filter shapes, a first filter shape for coding a first sample of a current video block of the video; and generating the bitstream based on the first filter shape, wherein performing the conversion comprises:

determining, from a plurality of sets of coefficients, a set of coefficients for a first offline-trained filter with the first filter shape, the first offline-trained filter being used for coding the first sample, each set of the plurality of sets of coefficients corresponding to one or more filter shapes; and performing the conversion based on the set of coefficients, and wherein the first sample is a luma sample, and a further offline-trained filter for coding a further luma sample of the video has a filter shape different from the first filter shape, or wherein the first sample is a chroma sample, and a further offline-trained filter for coding a further chroma sample of the video has a filter shape different from the first filter shape.

* * * * *